(12) United States Patent
Pringle, IV et al.

(10) Patent No.: US 10,195,637 B2
(45) Date of Patent: Feb. 5, 2019

(54) REMOVAL DEVICE FOR DECOUPLING TIP FROM BODY OF APPLICATOR

(71) Applicant: The Boeing Company, Chicago, IL (US)

(72) Inventors: John W. Pringle, IV, Gardena, CA (US); Chris Erickson, Garden Grove, CA (US); Ted Khong, Yorba Linda, CA (US); Don D. Trend, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/253,227

(22) Filed: Aug. 31, 2016

(65) Prior Publication Data

US 2017/0106395 A1    Apr. 20, 2017

Related U.S. Application Data

(60) Provisional application No. 62/242,216, filed on Oct. 15, 2015.

(51) Int. Cl.
*B23P 19/00* (2006.01)
*B05C 9/02* (2006.01)
(Continued)

(52) U.S. Cl.
CPC ............... *B05C 9/02* (2013.01); *A46B 11/06* (2013.01); *A46B 13/04* (2013.01); *B05C 5/02* (2013.01);
(Continued)

(58) Field of Classification Search
CPC .............. B23P 19/00; B23P 19/04; B23P 3/00
See application file for complete search history.

(56) References Cited

U.S. PATENT DOCUMENTS 4,067,476 A    1/1978  Moline et al.
4,513,474 A  *  4/1985  Watabe .................. E05D 5/046
                                            16/243
(Continued)

FOREIGN PATENT DOCUMENTS

EP    2842457    3/2015
WO    9810251    3/1998

OTHER PUBLICATIONS

Extended European Search Report for European Application No. 16193731.3 dated Mar. 7, 2017.
(Continued)

*Primary Examiner* — Lee D Wilson
(74) *Attorney, Agent, or Firm* — Kunzler, PC

(57) ABSTRACT

A removal device for decoupling a tip from a body of an applicator is disclosed. The removal device comprises a wall, comprising a proximal edge and a distal edge, opposite the proximal edge. The removal device also comprises a through channel in the wall. The removal device further comprises a pawl, comprising a proximal end, coupled to the wall, a distal end, opposite the proximal end, a first side between the proximal end and the distal end, and a second side, opposite to the first side. The distal end, the first side, and the second side of the pawl are delimited by the through channel and the pawl extends -between the proximal edge of the wall and the distal edge of the wall. The removal device additionally comprises a wedge, extending from the wall and perpendicular to the wall.

14 Claims, 24 Drawing Sheets

(51) Int. Cl.
*B25J 9/16* (2006.01)
*B25J 11/00* (2006.01)
*B05C 5/02* (2006.01)
*B05D 7/24* (2006.01)
*B05C 11/10* (2006.01)
*A46B 13/04* (2006.01)
*A46B 11/06* (2006.01)
*B05C 1/02* (2006.01)
*B05C 1/06* (2006.01)

(52) U.S. Cl.
CPC .......... *B05C 11/10* (2013.01); *B05C 11/1002* (2013.01); *B05D 7/24* (2013.01); *B25J 9/1679* (2013.01); *B25J 9/1692* (2013.01); *B25J 11/0075* (2013.01); *B05C 1/027* (2013.01); *B05C 1/06* (2013.01); *Y10S 901/02* (2013.01)

(56) References Cited

U.S. PATENT DOCUMENTS

| | | | |
|---|---|---|---|
| 4,765,575 A * | 8/1988 | Bergl | A47B 96/065 108/152 |
| 4,793,110 A * | 12/1988 | Tucker | E02D 27/00 248/188.4 |
| 4,808,063 A | 2/1989 | Haley et al. | |
| 5,263,608 A | 11/1993 | Kiernan et al. | |
| 5,316,252 A * | 5/1994 | Charnow | A47F 5/08 211/85.1 |
| 5,462,199 A | 10/1995 | Lenhardt et al. | |
| 5,598,973 A | 2/1997 | Weston et al. | |
| 5,628,531 A | 5/1997 | Rosenberg et al. | |
| 5,680,967 A | 10/1997 | Dang et al. | |
| 5,782,410 A | 7/1998 | Weston et al. | |
| 5,863,146 A | 1/1999 | Denkins et al. | |
| 6,082,597 A | 7/2000 | Beckett et al. | |
| 6,223,941 B1 | 5/2001 | Nealey et al. | |
| 7,922,107 B2 | 4/2011 | Fox | |
| 8,651,046 B1 | 2/2014 | Davancens et al. | |
| 2002/0112821 A1 | 8/2002 | Inaba et al. | |
| 2007/0017072 A1 | 1/2007 | Serio et al. | |
| 2008/0105703 A1 | 5/2008 | Prentice et al. | |
| 2011/0121035 A1 | 5/2011 | Greter et al. | |
| 2011/0300295 A1 | 12/2011 | Clark et al. | |
| 2013/0177870 A1 | 7/2013 | Wang et al. | |
| 2014/0158717 A1 | 6/2014 | Ettlin et al. | |
| 2014/0326760 A1 | 11/2014 | Topf et al. | |
| 2015/0028051 A1 | 1/2015 | Topf et al. | |
| 2015/0083751 A1 | 3/2015 | Aigner et al. | |
| 2017/0106395 A1 * | 4/2017 | Pringle, IV | B05C 9/02 |
| 2017/0106398 A1 * | 4/2017 | Pringle, IV | B05C 5/0225 |
| 2017/0106400 A1 | 4/2017 | Pringle et al. | |
| 2017/0106401 A1 | 4/2017 | Pringle et al. | |
| 2017/0106402 A1 | 4/2017 | Pringle et al. | |

OTHER PUBLICATIONS

Aerospace Dispensing Systems, Fori's New Aerospace Division Blog dated Oct. 3, 2013, http://fori-aerospace.blogspot.com/2013/10/aerospace-dispensing-systems.html, Fori Automation, Inc., accessed Jun. 2, 2016.

Notice of Allowance for U.S. Appl. No. 15/009,431 dated Mar. 15, 2018.

Notice of Allowance for U.S. Appl. No. 15/253,182 dated Apr. 9, 2018.

Notice of Allowance for U.S. Appl. No. 15/009,765 dated Jul. 16, 2018.

* cited by examiner

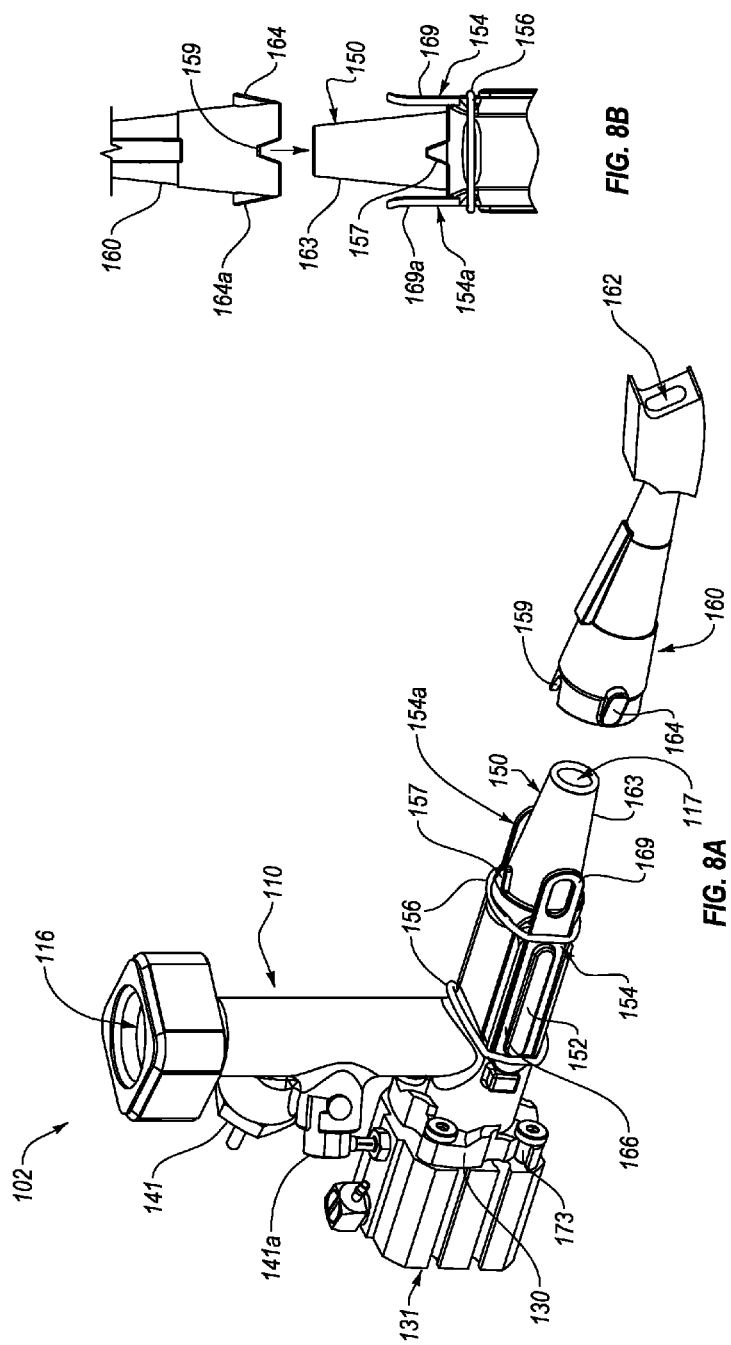

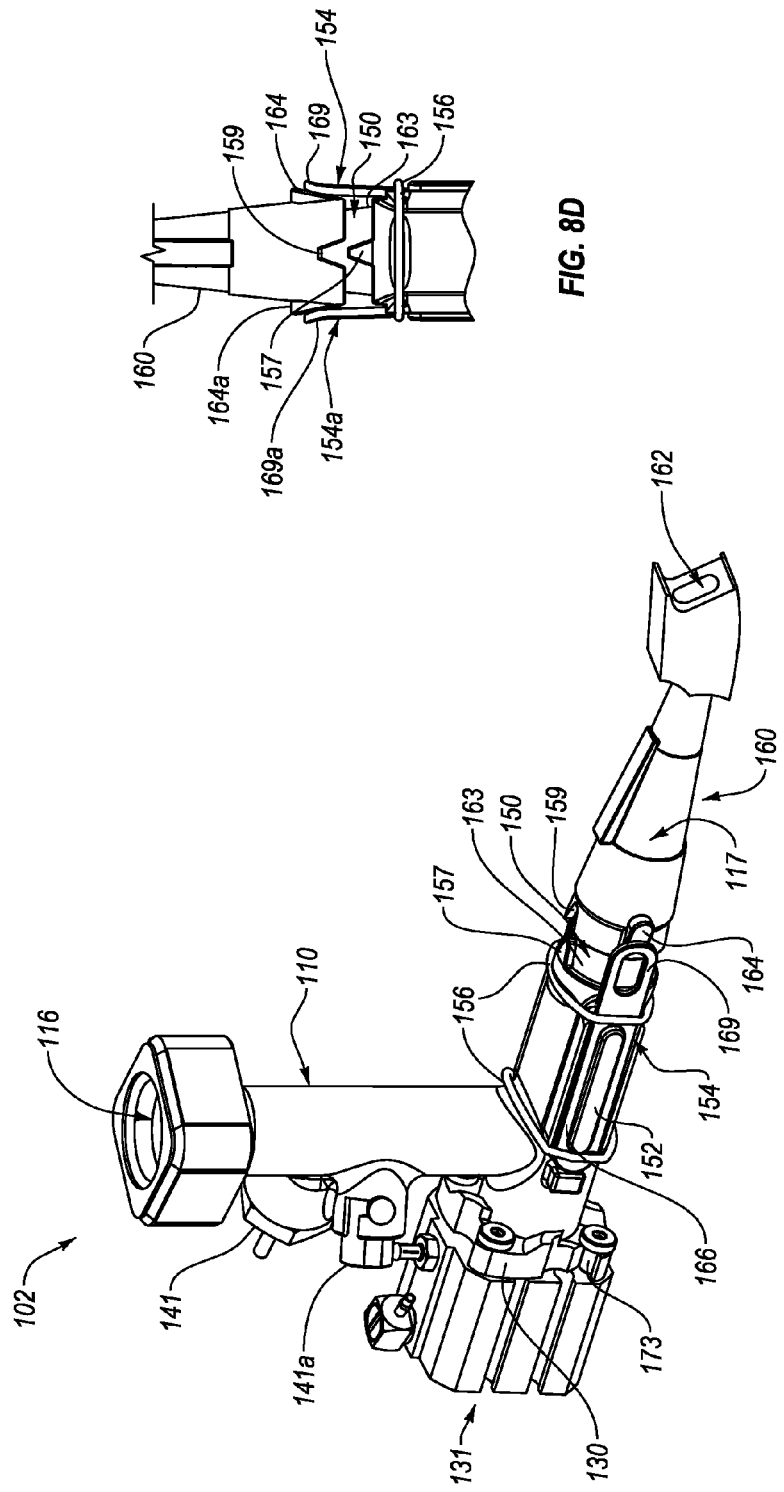

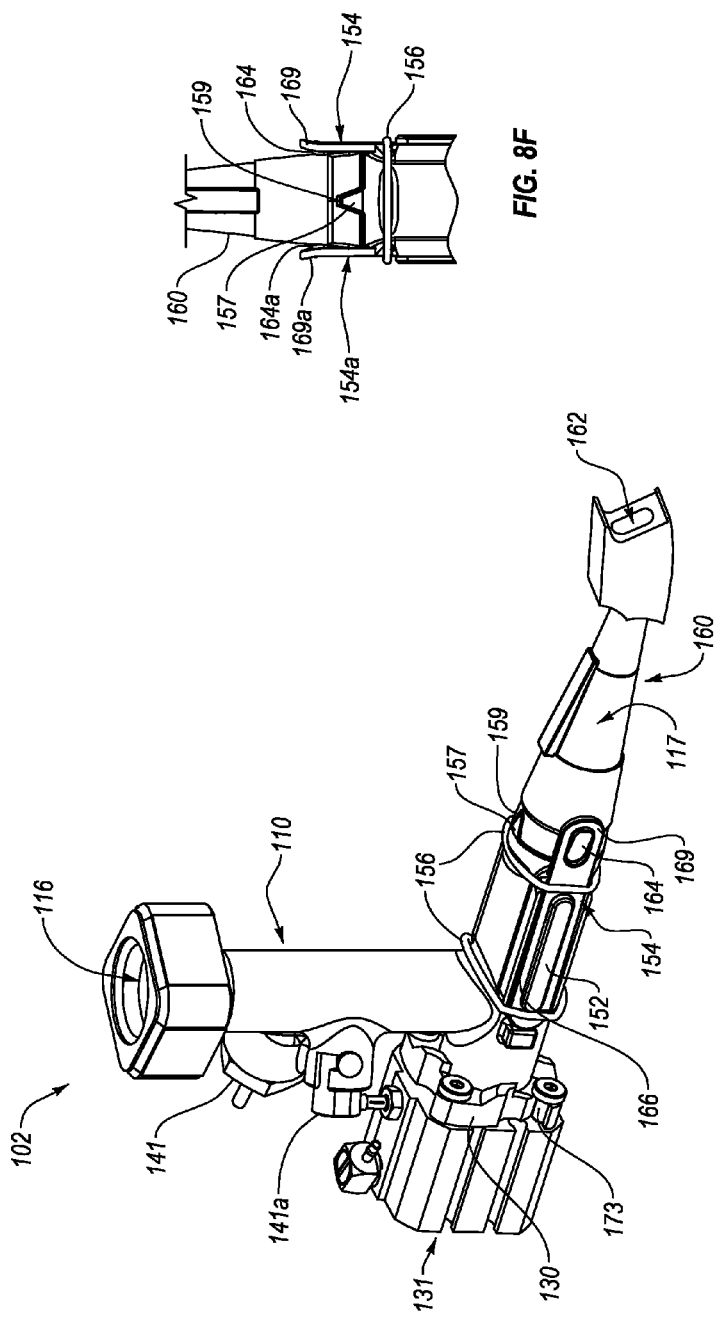

200

202
USING END-EFFECTOR (101) TO POSITION APPLICATOR (102) RELATIVE TO WORKPIECE (170), WHEREIN APPLICATOR (102) COMPRISES: BODY (110) COMPRISING FIRST CHANNEL (115) THAT COMPRISES INLET PORTION (180), COMPRISING INLET (116), AND OUTLET PORTION (182), COMPRISING OUTLET (117), AND SECOND CHANNEL (184), COMMUNICATIVELY COUPLED WITH FIRST CHANNEL (115); PLUNGER (186), COMPRISING GATE (118); ACTUATOR (131), SELECTIVELY OPERABLE TO MOVE PLUNGER (186); AND SENSOR (141), COMMUNICATIVELY COUPLED WITH FIRST CHANNEL (115) AND CONFIGURED TO DETECT AT LEAST ONE CHARACTERISTIC OF GLUTINOUS SUBSTANCE (168) IN FIRST CHANNEL (115) AND TO GENERATE OUTPUT CORRESPONDING TO AT LEAST THE ONE CHARACTERISTIC OF THE GLUTINOUS SUBSTANCE

204
URGING GLUTINOUS SUBSTANCE (168) FROM END-EFFECTOR (101) THROUGH FIRST CHANNEL (115) OF BODY (110) OF APPLICATOR (102) FROM INLET (116) OF FIRST CHANNEL (115) TOWARD OUTLET (117) OF FIRST CHANNEL (115)

206
SELECTIVELY OPERATING ACTUATOR (131) OF APPLICATOR (102) TO REGULATE A RATE AT WHICH GLUTINOUS SUBSTANCE (168) FLOWS THROUGH FIRST CHANNEL (115) OF BODY (110) OF APPLICATOR (102) RESPONSIVE TO, AT LEAST IN PART, THE OUTPUT RECEIVED FROM SENSOR (141)

208
CAUSING ACTUATOR (131) OF APPLICATOR (102) TO MOVE GATE (118) OF PLUNGER (186) BETWEEN, INCLUSIVELY, AN OPEN POSITION, ALLOWING GLUTINOUS SUBSTANCE (168) TO FLOW FROM INLET (116) OF FIRST CHANNEL (115) TO OUTLET (117) OF FIRST CHANNEL (115) AND A CLOSED POSITION, PREVENTING GLUTINOUS SUBSTANCE (168) FROM FLOWING FROM INLET (116) OF FIRST CHANNEL (115) TO OUTLET (117) OF FIRST CHANNEL (115), RESPONSIVE TO, AT LEAST IN PART, OUTPUT FROM SENSOR (141) INDICATING A CHANGE IN AT LEAST THE ONE CHARACTERISTIC OF GLUTINOUS SUBSTANCE (168) DETECTED BY SENSOR (141)

502
WITH COUPLER (154) OF APPLICATOR (102) RELEASABLY ENGAGED WITH TIP (160), LOCATING END-EFFECTOR (101) SO THAT PAWL (404) IS ENGAGED WITH THIRD TOOTH (161) ON TIP (160) TO PREVENT MOVEMENT OF TIP (160) IN FIFTH DIRECTION (420) AWAY FROM PAWL (404), AND WEDGE (406) DISENGAGES COUPLER (154) OF APPLICATOR (102) FROM TIP (160)

506
USING END-EFFECTOR (101) TO MOVE BODY (110) OF APPLICATOR (102) TOWARD PAWL (404), IN SIXTH DIRECTION (422) OPPOSITE FIFTH DIRECTION (420), ALONG A STRAIGHT LINE UNTIL PAWL (404) ENGAGES THIRD TOOTH (161)

508
AS END-EFFECTOR (101) MOVES BODY (110) OF APPLICATOR (102) IN A STRAIGHT LINE IN SIXTH DIRECTION (422), WEDGE (406) CAUSES COUPLER (154) OF APPLICATOR (102) TO DISENGAGE FROM TIP (160)

510
LOCATING END-EFFECTOR (101), SO THAT PAWL (404) IS ENGAGED WITH THIRD TOOTH (161) ON TIP (160), COMPRISES RESILIENTLY FLEXING PAWL (404)

512
LOCATING END-EFFECTOR (101), SO THAT PAWL (404) IS ENGAGED WITH THIRD TOOTH (161) ON TIP (160), COMPRISES USING END-EFFECTOR (101) TO MOVE BODY (110) OF APPLICATOR (102) IN SEVENTH DIRECTION (424), PERPENDICULAR TO FIFTH DIRECTION (420), ALONG A STRAIGHT LINE UNTIL PAWL (404) IS ENGAGED WITH THIRD TOOTH (161) ON TIP (160)

514
AS END-EFFECTOR (101) MOVES BODY (110) OF APPLICATOR (102) IN A STRAIGHT LINE IN SEVENTH DIRECTION (424), PERPENDICULAR TO FIFTH DIRECTION (420), WEDGE (406) CAUSES COUPLER (154) OF APPLICATOR (102) TO DISENGAGE FROM TIP (160)

516
DISENGAGING COUPLER (154) OF APPLICATOR (102) FROM TIP (160) WITH WEDGE (406) COMPRISES MOVING COUPLER (154) AWAY FROM TIP (160)

518
APPLICATOR (102) FURTHER COMPRISES RETAINER (156), CONFIGURED TO MAINTAIN COUPLER (154) IN CONTACT WITH BODY (110) AND WITH TIP (160) WHEN TIP (160) IS INTERLOCKED WITH BODY (110) OF APPLICATOR (102), AND MOVING COUPLER (154) AWAY FROM TIP (160) COMPRISES RESILIENTLY STRETCHING RETAINER (156)

WITH PAWL (404) ENGAGED WITH THIRD TOOTH (161) ON TIP (160) AND COUPLER (154) OF APPLICATOR (102) DISENGAGED FROM TIP (160) BY WEDGE (406), USING END-EFFECTOR (101) TO MOVE BODY (110) OF APPLICATOR (102) IN FIFTH DIRECTION (420) TO DISENGAGE TIP (160) FROM BODY (110) OF APPLICATOR (102)

*FIG. 15B*

REMOVAL DEVICE FOR DECOUPLING TIP FROM BODY OF APPLICATOR

TECHNICAL FIELD

The present disclosure relates to systems, apparatuses, and methods for coupling a tip to and decoupling a tip from a body of an applicator, configured to deliver a glutinous substance to a workpiece from an end-effector.

BACKGROUND

It is commonplace to use manual techniques to apply glutinous substances, such as sealants, adhesives, and fillers, to surfaces of structures or other objects for purposes of sealing, corrosion-resistance mitigation, and/or fixation, among others. However, manual surface application of glutinous substances in a uniform, repeatable manner is difficult and time consuming.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to an installation device for coupling a tip to a body of an applicator. The applicator comprises a coupler, releasably engageable with the tip to interlock the tip with the body of the applicator. The installation device comprises a tip holder that comprises two resilient pawls, opposing each other and configured to releasably retain the tip.

The installation device facilitates the automated coupling of the tip to the body of the applicator. For example, the installation device releasably retains the tip in preparation for the body of the applicator to be located by the end-effector such that the tip interlocks with the body to couple the tip to the body. After the tip, releasably retained by the two resilient pawls of the installation device, interlocks with the body of the applicator, movement of the body of the applicator away from the installation device causes the installation device to release the tip from the two resilient pawls of the installation device.

Another example of the subject matter according to the invention relates to a removal device for decoupling a tip from a body of an applicator. The removal device comprises a wall, comprising a proximal edge and a distal edge, opposite the proximal edge. The removal device also comprises a through channel in the wall. The removal device further comprises a pawl, comprising a proximal end, coupled to the wall, a distal end, opposite the proximal end, a first side between the proximal end and the distal end, and a second side, opposite to the first side. The distal end, the first side, and the second side of the pawl are delimited by the through channel and the pawl extends in a fifth direction from the proximal end to the distal end between the proximal edge of the wall and the distal edge of the wall. The removal device additionally comprises a wedge, extending from the wall and perpendicular to the wall.

The removal device facilitates the automated decoupling of the tip from the body of the applicator. As one example, removal device promotes concurrent disengagement of the coupler of the applicator from the tip and prevention of movement of the tip in the fifth direction as the body of the applicator moves in the fifth direction. The pawl, being coupled to the wall and having the distal end, the first side, and the second side delimited by through the channel, helps to streamline the removal device and promotes consistent flexing of the pawl relative to the wall. The wedge, extending perpendicular to the wall, locates the wedge relative to the pawl such that the coupler of the applicator can be engaged by the wedge when the tip is engaged by the pawl. Also, the wedge provides mechanical advantage for separating the coupler from the tip.

Yet another example of the subject matter according to the invention relates to a method of removing a tip from a body of an applicator, fixed to an end-effector. The applicator comprises a coupler, releasably engageable with the tip to interlock the tip with the body of the applicator. The method comprises, with the coupler of the applicator releasably engaged with the tip, locating the end-effector so that a pawl is engaged with a third tooth on the tip to prevent movement of the tip in a fifth direction away from the pawl and a wedge disengages the coupler of the applicator from the tip. The method also comprises, with the pawl engaged with the third tooth on the tip and the coupler of the applicator disengaged from the tip by the wedge, using the end-effector to move the body of the applicator in the fifth direction to disengage the tip from the body of the applicator.

The method facilitates the automated decoupling of the tip from the body of the applicator. As one example, the method promotes concurrent and automatic disengagement of the coupler of the applicator from the tip and prevention of movement of the tip in the fifth direction as the body of the applicator moves in the fifth direction. The wedge provides mechanical advantage for disengaging the coupler from the tip.

BRIEF DESCRIPTION OF THE DRAWINGS

Figure 1A:
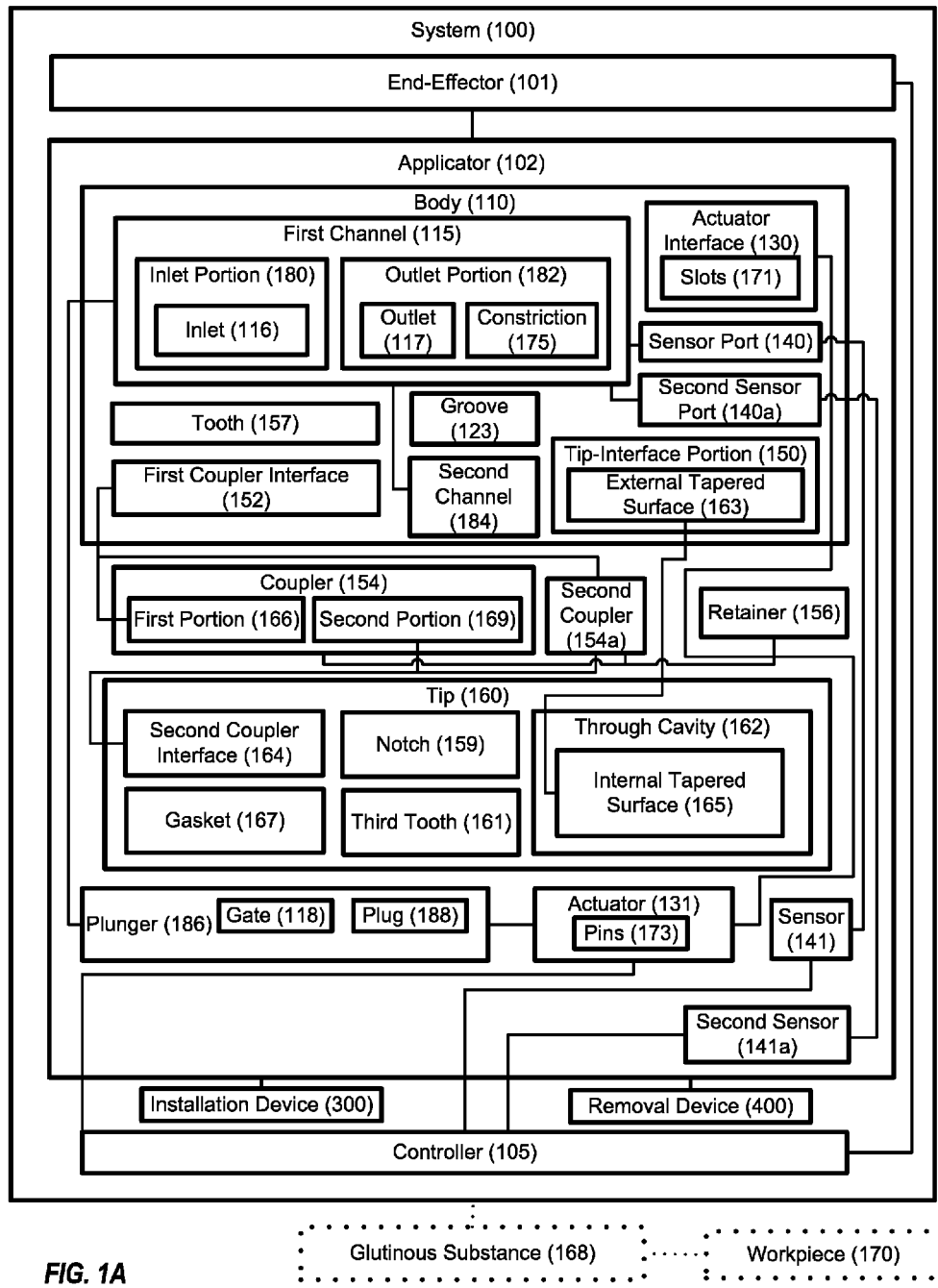
Figure 1B:
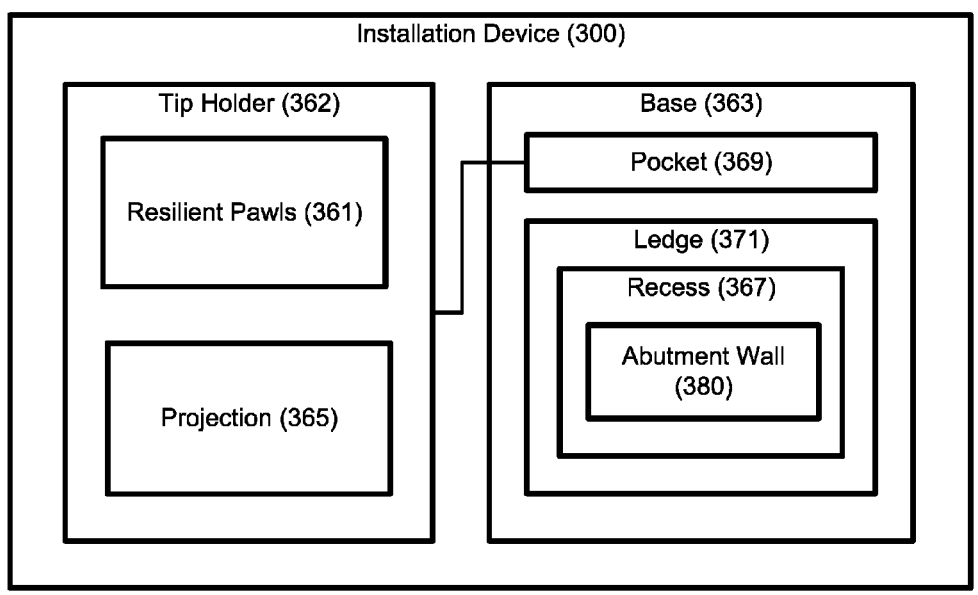
Figure 1C:
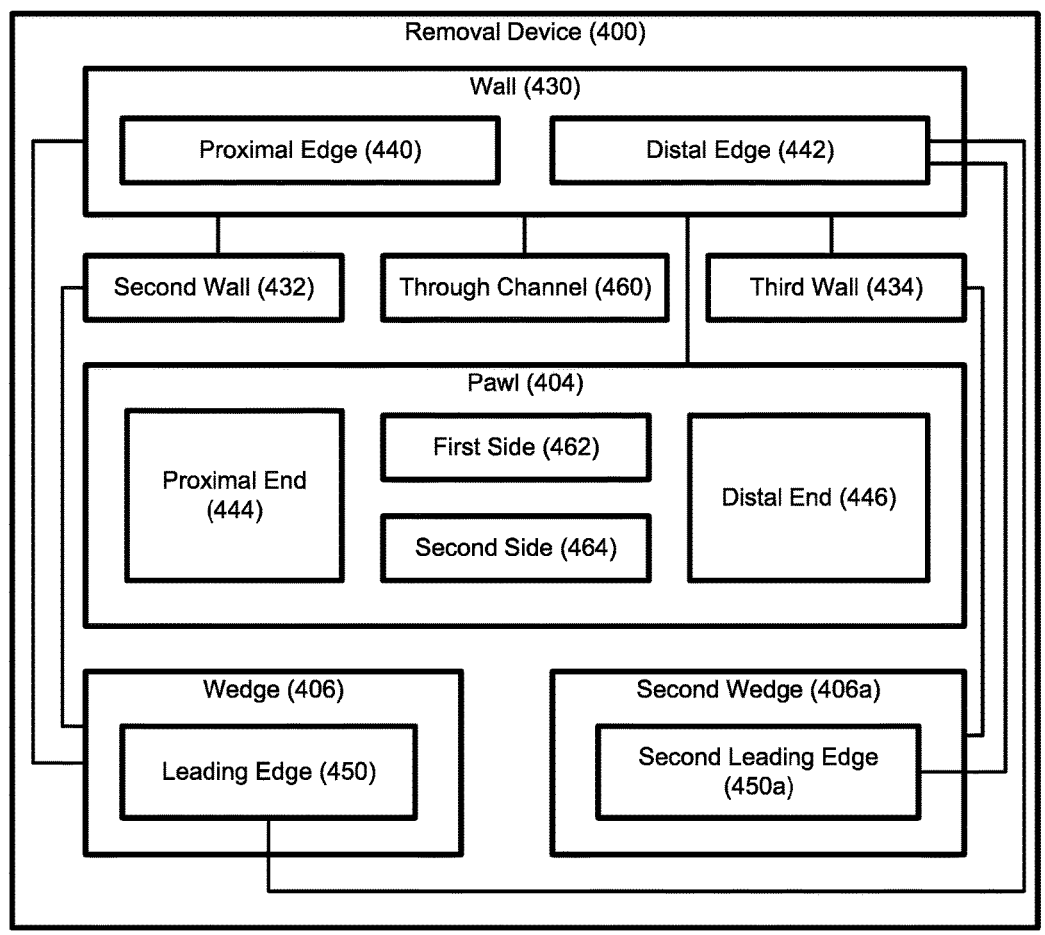
Figure 2:
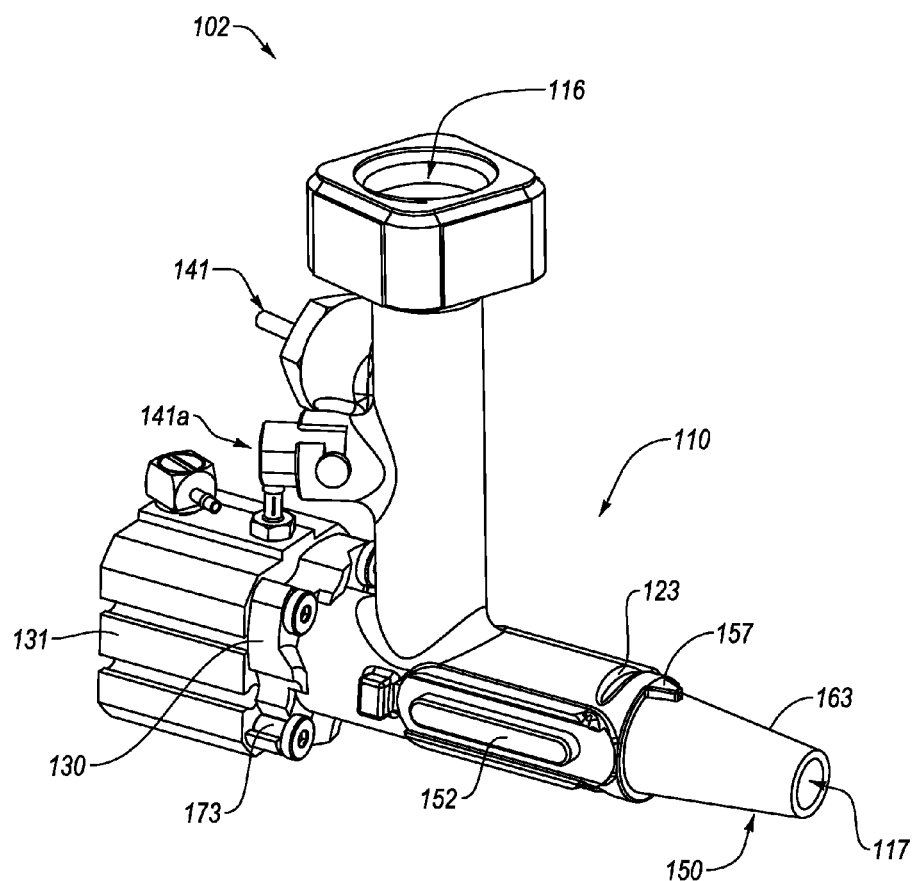
Figure 4:
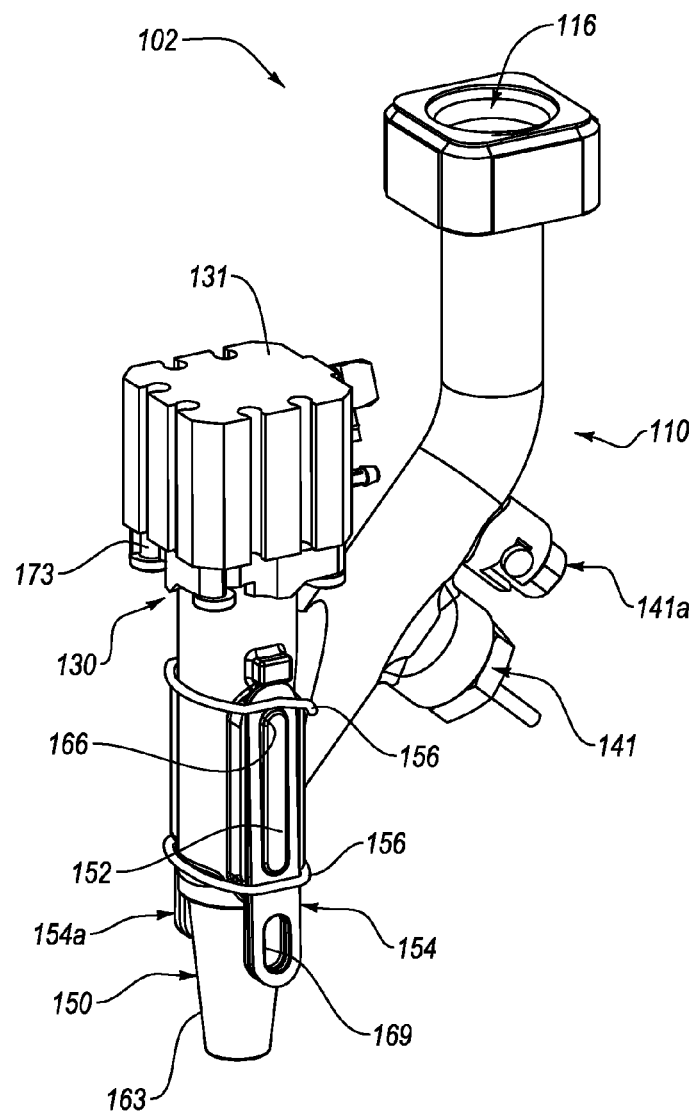
Figure 5A:
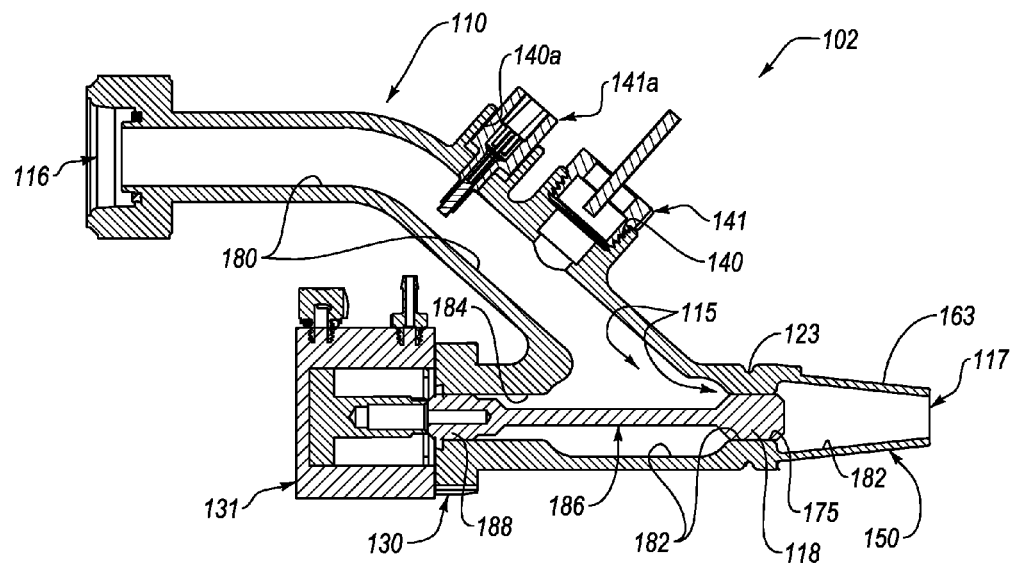
Figure 5B:
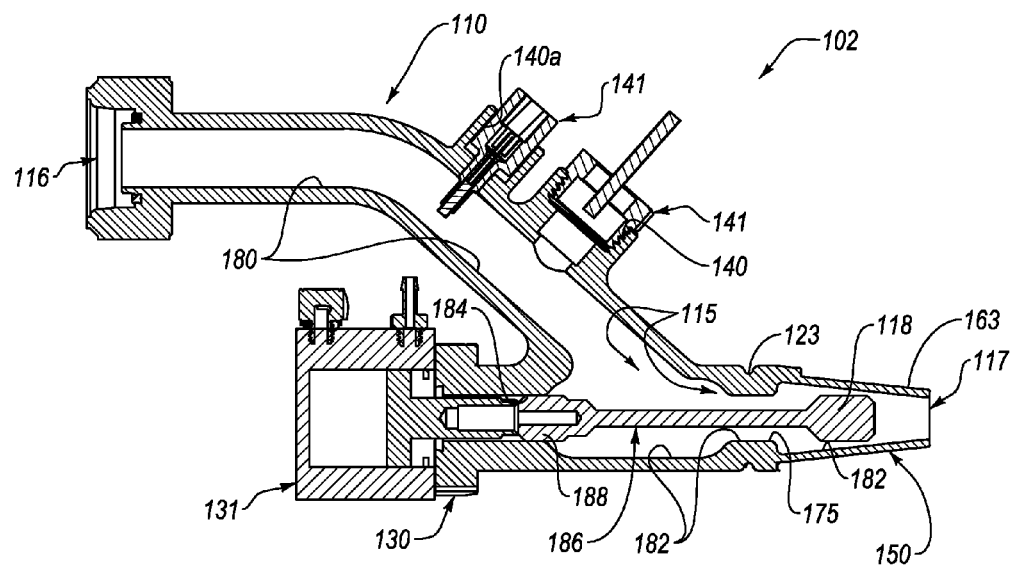
Figure 6:
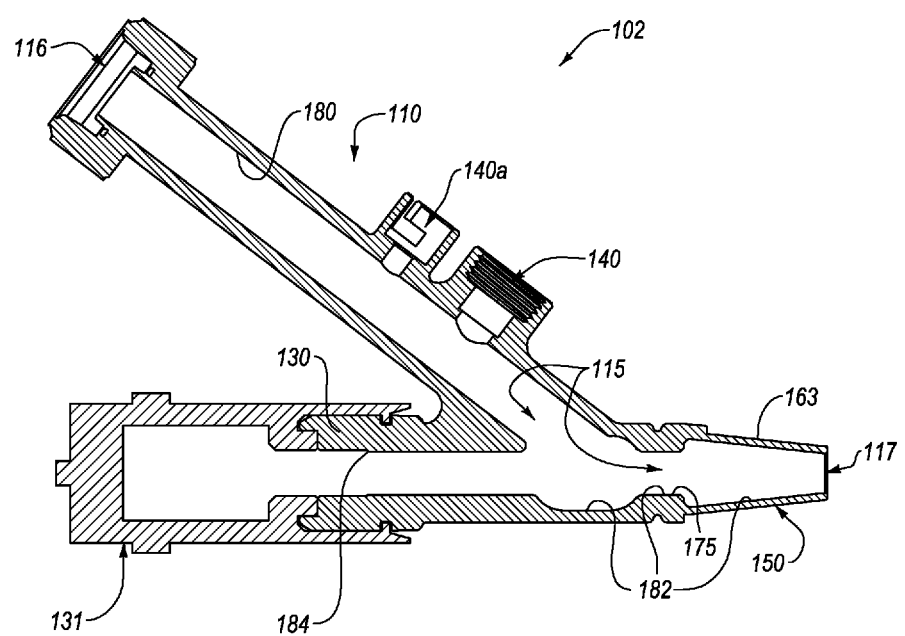
Figure 7A:
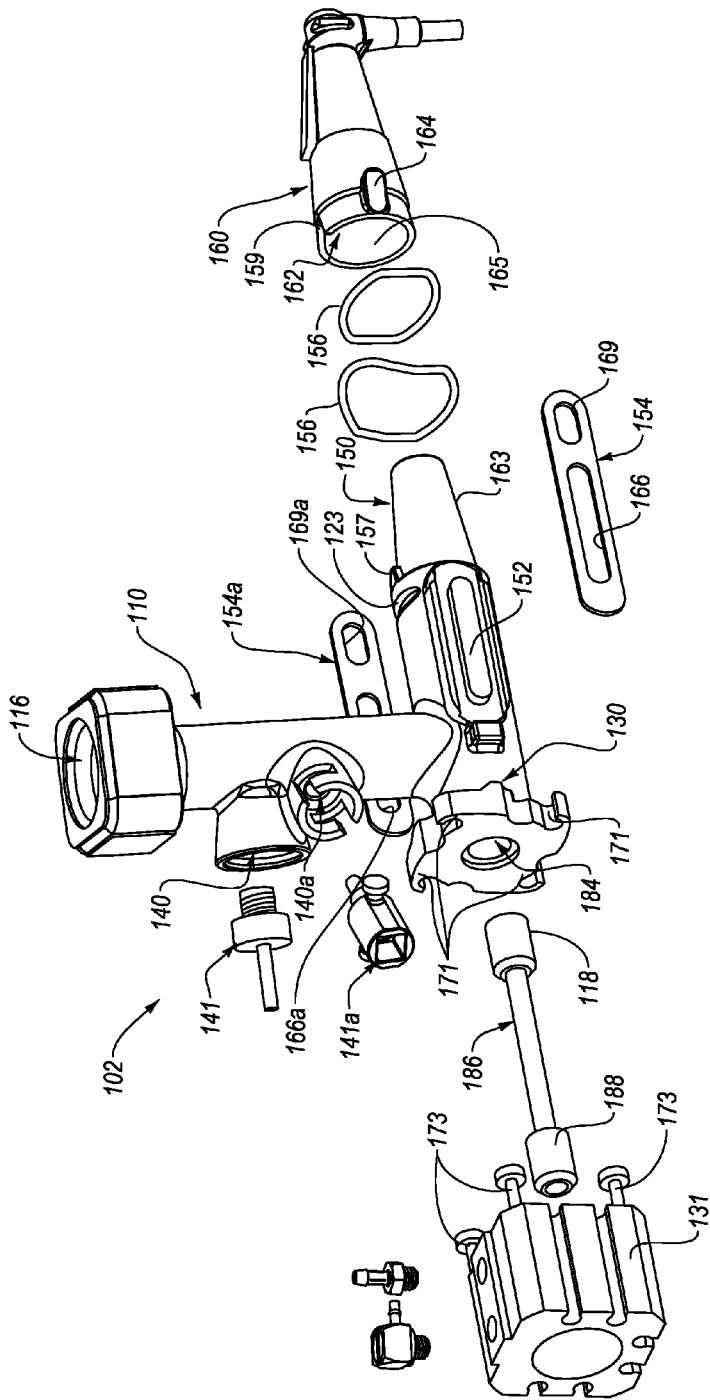
Figure 7B:
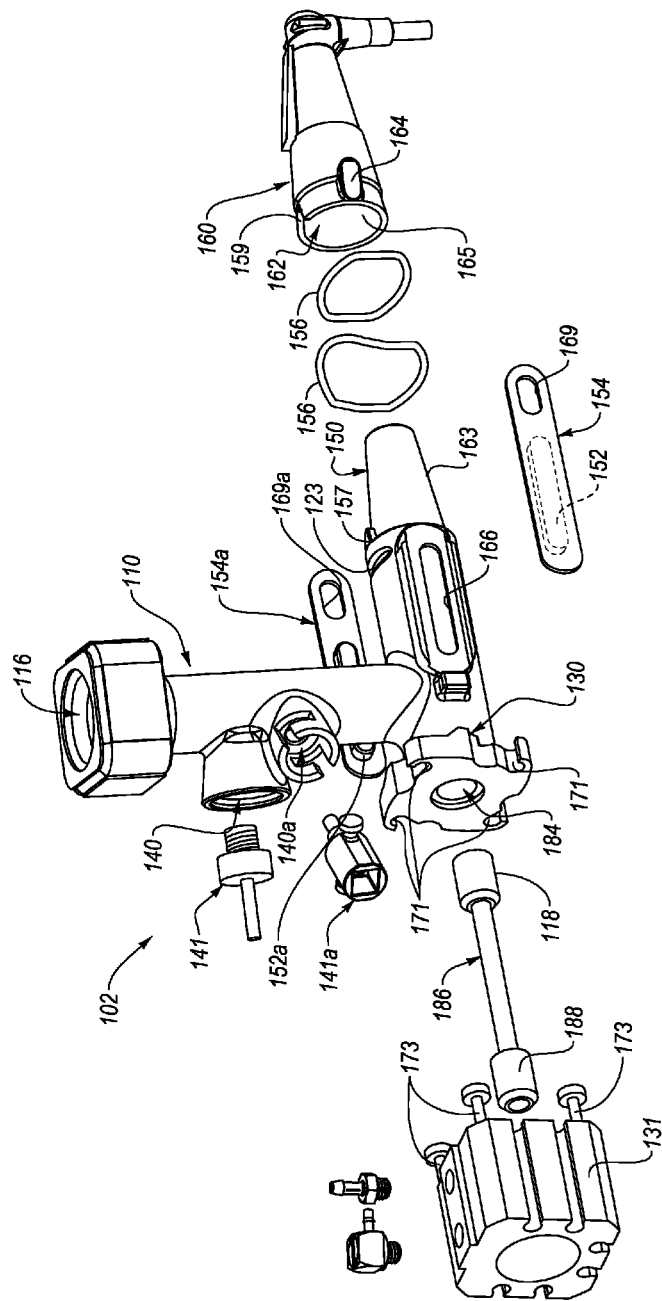
Figure 8G:
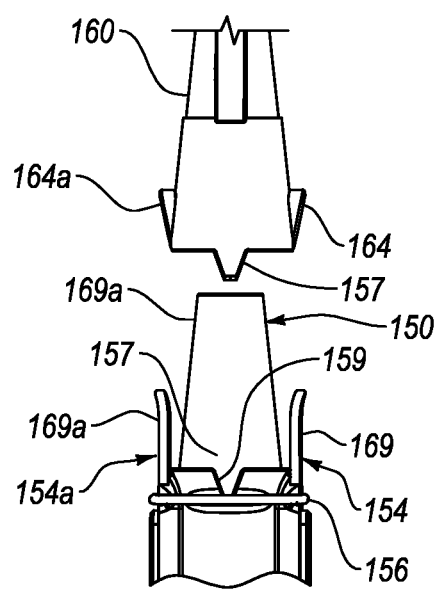
Figure 9:
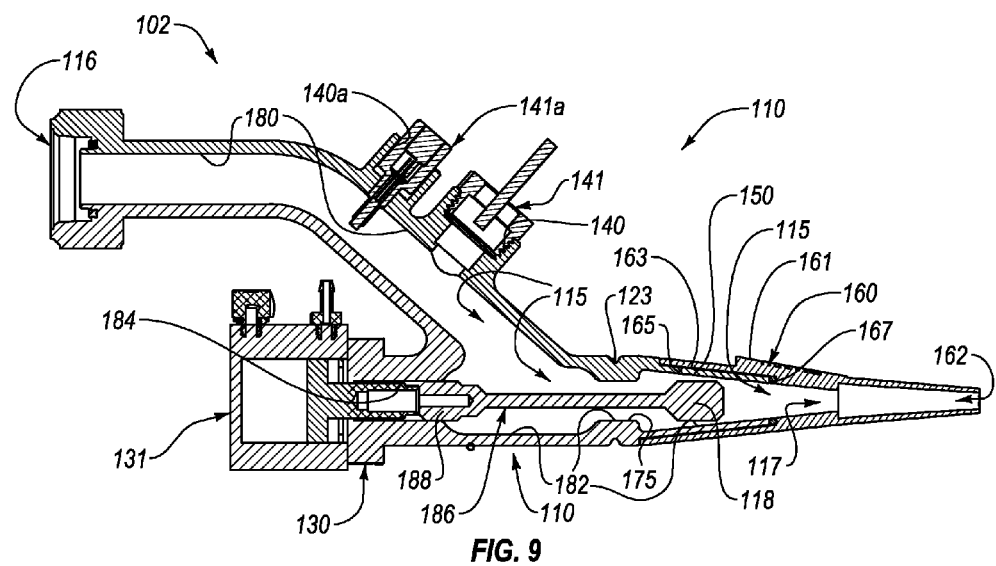
Figure 10:
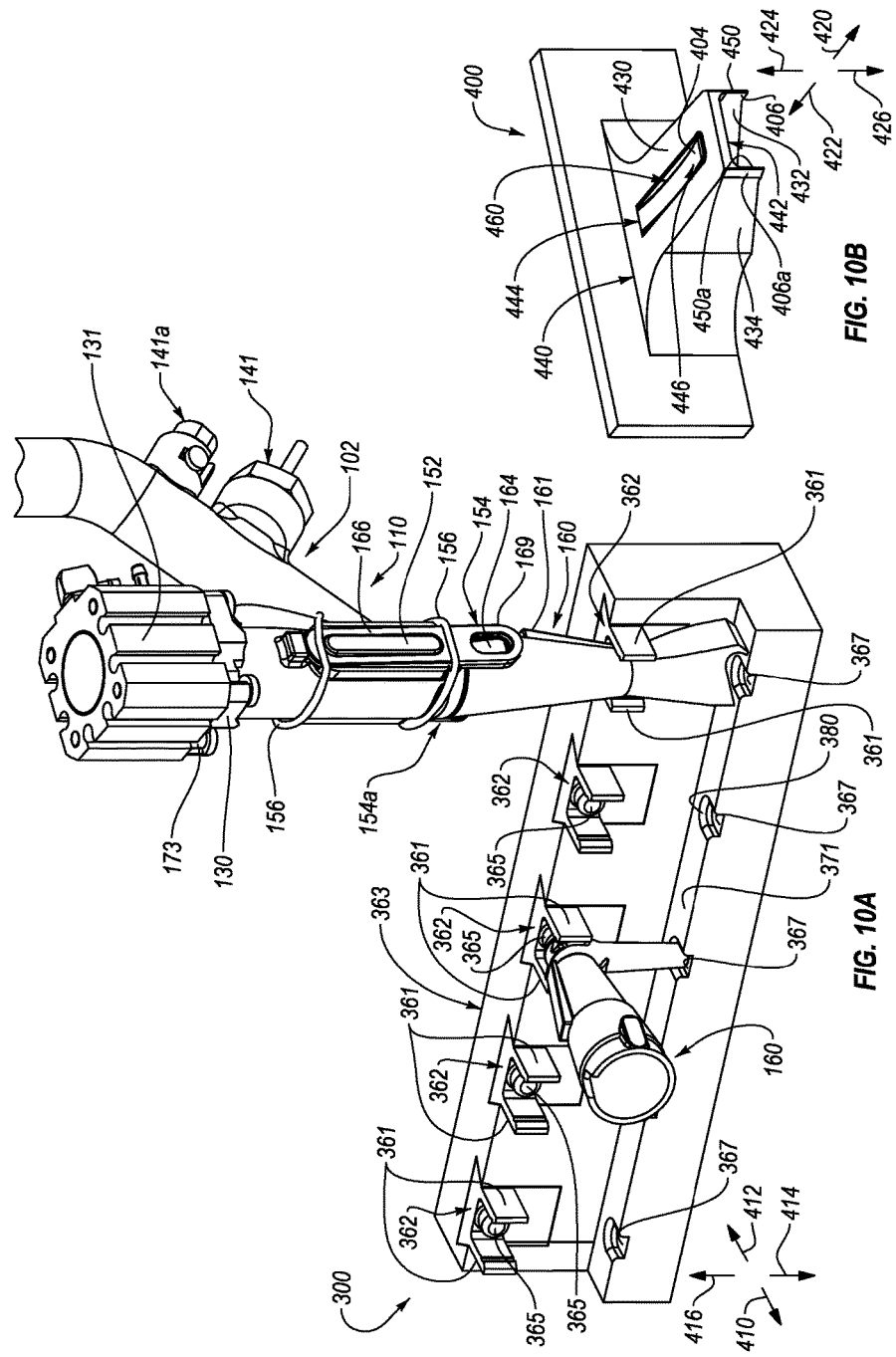
Figure 11:
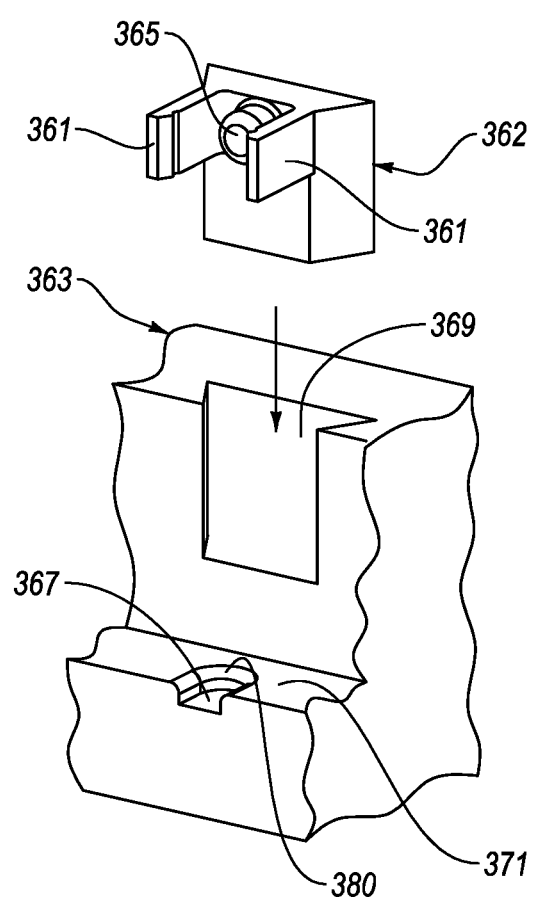
Figure 12:
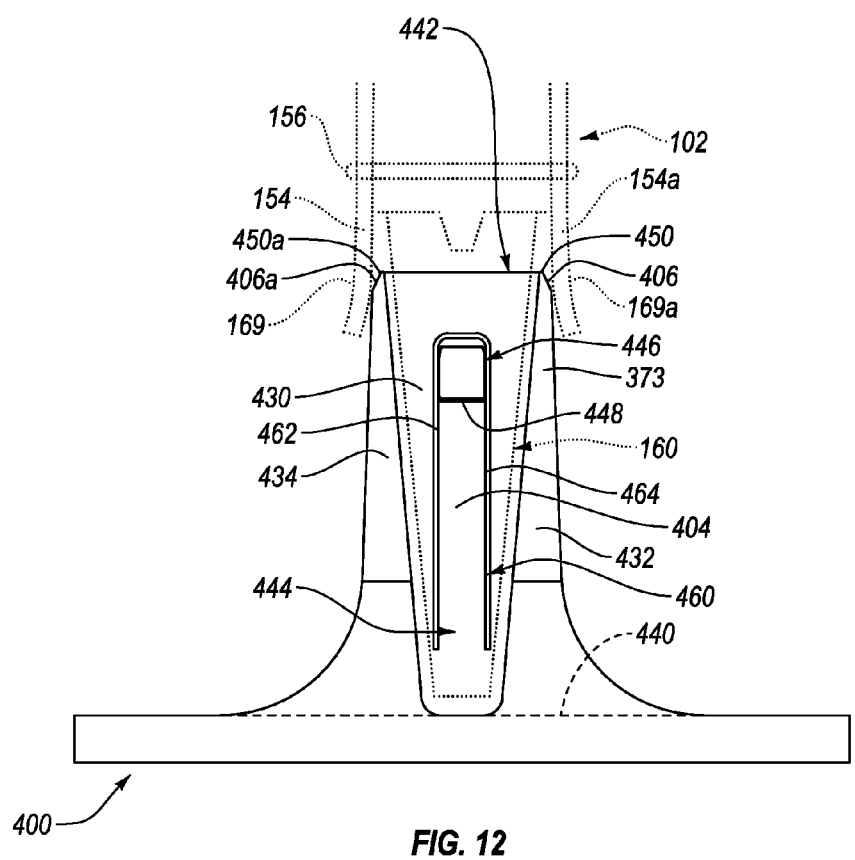
Figure 13A:
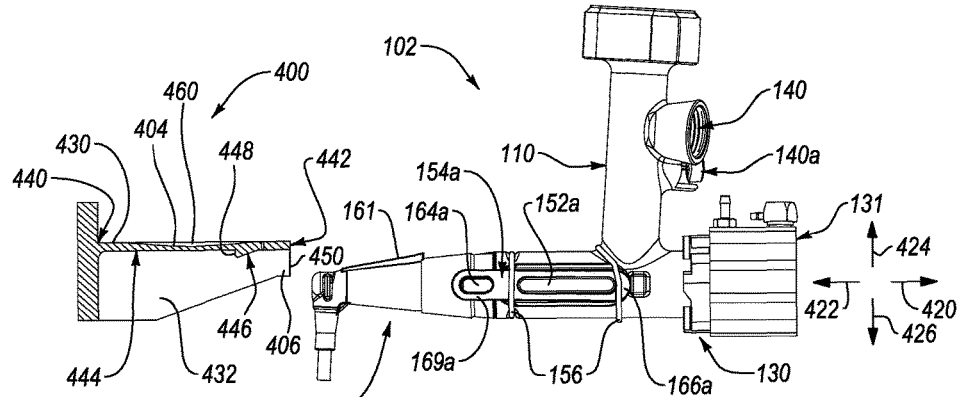
Figure 13B:
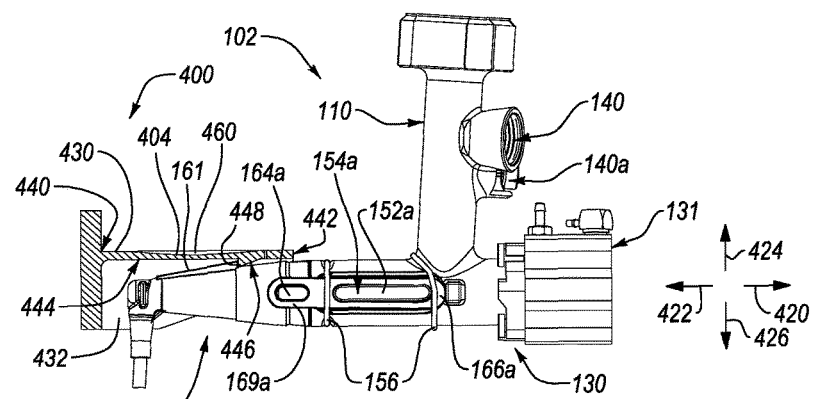
Figure 13C:
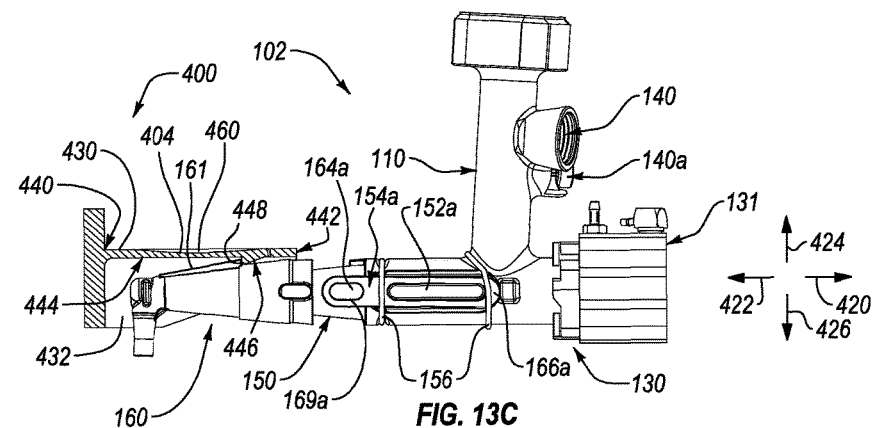
Figure 16:
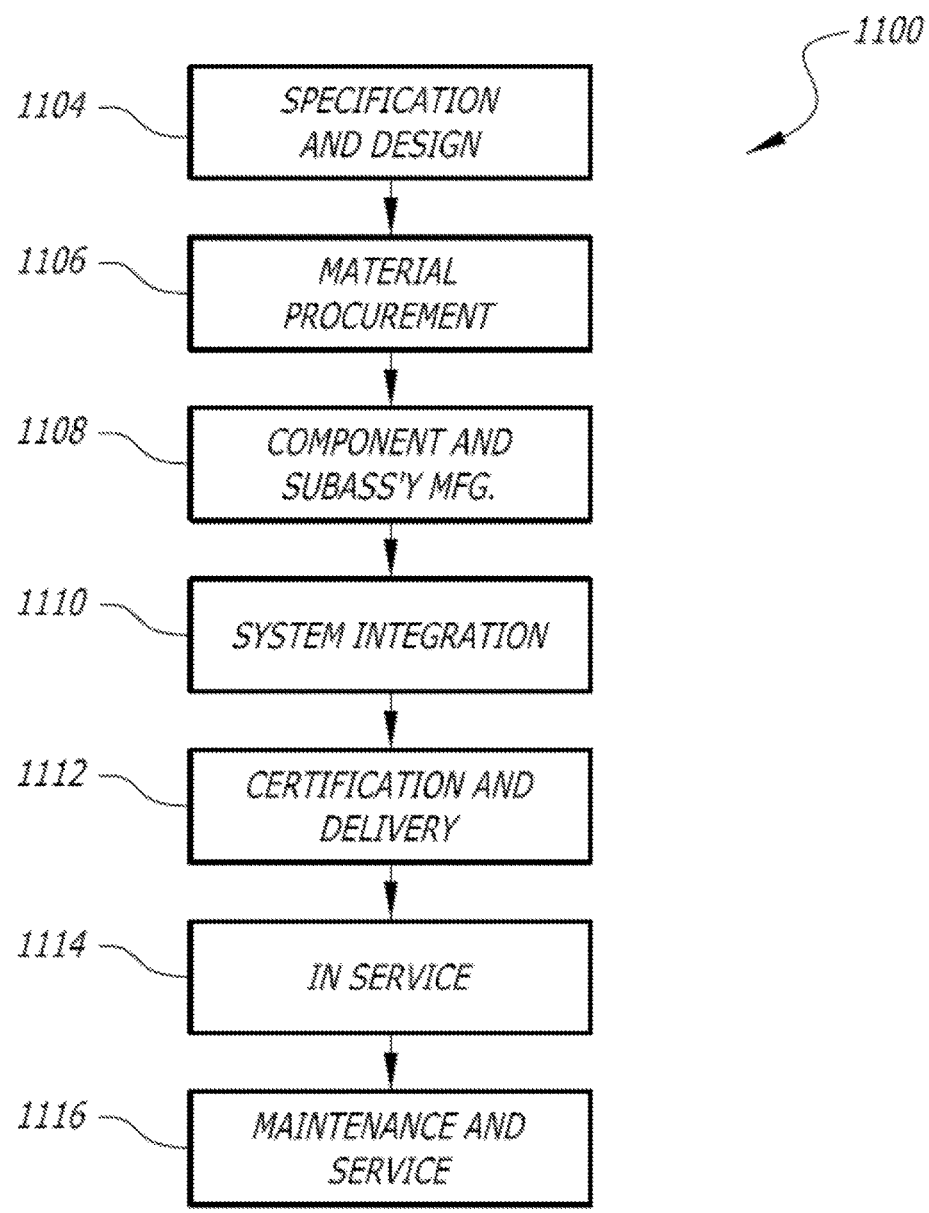

Having thus described one or more examples of the invention in general terms, reference will now be made to the accompanying drawings, which are not necessarily drawn to scale, and wherein like reference characters designate the same or similar parts throughout the several views, and wherein:

FIG. 1A is a block diagram of a system for delivering a glutinous substance to a workpiece from an end-effector, according to one or more examples of the present disclosure;

FIG. 1B is a block diagram of an installation device of the system of FIG. 1A, according to one or more examples of the present disclosure;

FIG. 1C is a block diagram of a removal device of the system of FIG. 1A, according to one or more examples of the present disclosure;

FIG. 2 is a schematic, perspective view of an applicator of the system of FIG. 1A, according to one or more examples of the present disclosure;

FIG. 3A is a schematic, cross-sectional view of the applicator of FIG. 2, according to one or more examples of the present disclosure;

FIG. 3B is a schematic, cross-sectional view of the applicator of FIG. 2, according to one or more examples of the present disclosure;

FIG. 4 is a schematic, perspective view of an applicator of the system of FIG. 1A, according to one or more examples of the present disclosure;

FIG. 5A is a schematic, cross-sectional view of the applicator of FIG. 4, according to one or more examples of the present disclosure;

FIG. 5B is a schematic, cross-sectional view of the applicator of FIG. 4, according to one or more examples of the present disclosure;

FIG. 6 is a schematic, cross-sectional view of an applicator of the system of FIG. 1A, according to one or more examples of the present disclosure;

FIG. 7A is a schematic, exploded perspective view of an applicator of the system of FIG. 1A, according to one or more examples of the present disclosure;

FIG. 7B is a schematic, exploded perspective view of an applicator of the system of FIG. 1A, according to one or more examples of the present disclosure;

FIG. 8A is a schematic, perspective view of an applicator of the system of FIG. 1A, according to one or more examples of the present disclosure;

FIG. 8B is a schematic, top plan view of a detail of the applicator of FIG. 8A, according to one or more examples of the present disclosure;

FIG. 8C is a schematic, perspective view of an applicator of the system of FIG. 1A, according to one or more examples of the present disclosure;

FIG. 8D is a schematic, top plan view of a detail of the applicator of FIG. 8C, according to one or more examples of the present disclosure;

FIG. 8E is a schematic, perspective view of an applicator of the system of FIG. 1A, according to one or more examples of the present disclosure;

FIG. 8F is a schematic, top plan view of a detail of the applicator of FIG. 8E, according to one or more examples of the present disclosure;

FIG. 8G is a schematic, top plan view of a detail of an applicator of the system of FIG. 1A, according to one or more examples of the present disclosure;

FIG. 9 is a schematic, cross-sectional side of an applicator of the system of FIG. 1A, according to one or more examples of the present disclosure;

FIG. 10A is a schematic, perspective view of an applicator of the system of FIG. 1A and an installation device of FIG. 1B, according to one or more examples of the present disclosure;

FIG. 10B is a schematic, perspective view of a removal device of FIG. 1C, according to one or more examples of the present disclosure;

FIG. 11 is a schematic, exploded perspective view of a detail of the installation device of FIG. 10A, according to one or more examples of the present disclosure;

FIG. 12 is a schematic, bottom view of the removal device of FIG. 10B, according to one or more examples of the present disclosure;

FIG. 13A is a schematic illustration of an applicator of the system of FIG. 1A in a first orientation relative to the removal device of FIG. 10B, according to one or more examples of the present disclosure;

FIG. 13B is a schematic illustration of the applicator of FIG. 13A in a second orientation relative to the removal device of FIG. 10B, according to one or more examples of the present disclosure;

FIG. 13C is a schematic illustration of the applicator of FIG. 13A in a third orientation relative to the removal device of FIG. 10B, according to one or more examples of the present disclosure;

FIG. 14 is a block diagram of a method of delivering a glutinous substance to a workpiece from an end-effector, according to one or more examples of the present disclosure;

FIGS. 15A and 15B collectively are a block diagram of a method of removing a tip from a body of an applicator, fixed to an end-effector, according to one or more examples of the present disclosure;

FIG. 16 is a block diagram of aircraft production and service methodology; and

Figure 17:
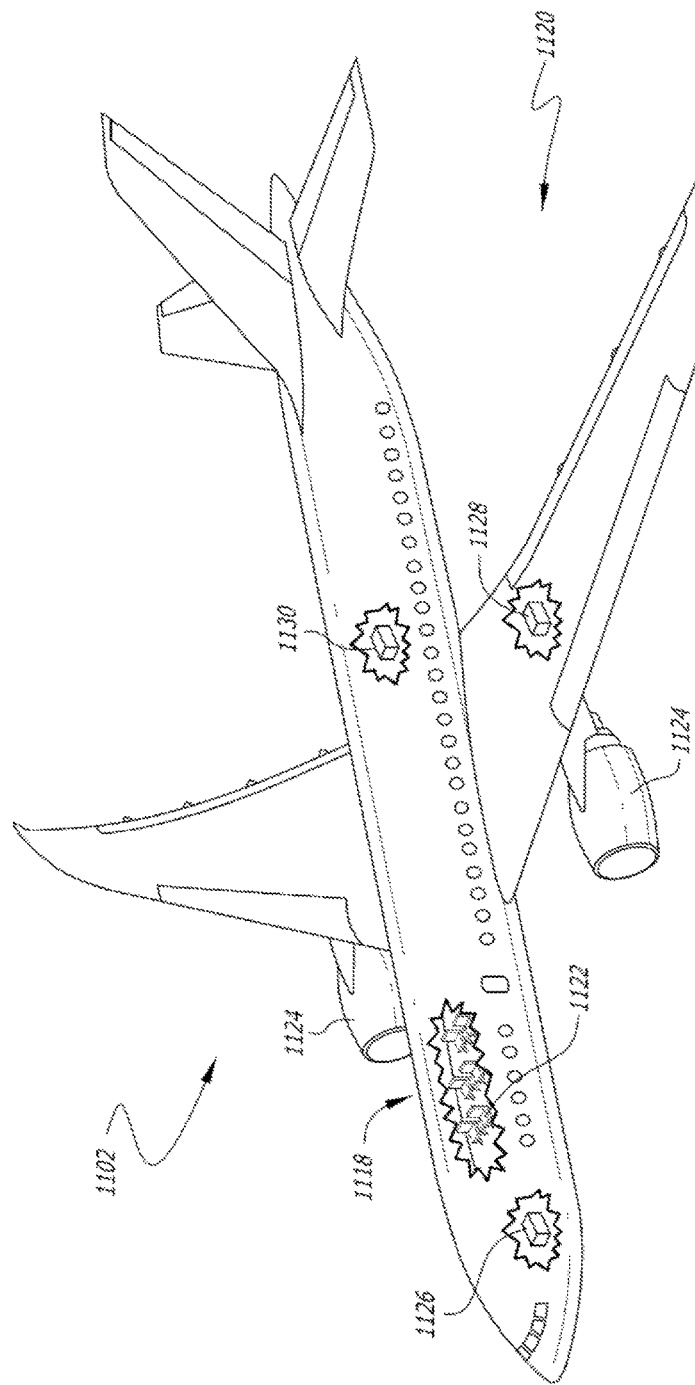

FIG. 17 is a schematic illustration of an aircraft.

DETAILED DESCRIPTION

In FIGS. 1A-1C, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1A-1C may be combined in various ways without the need to include other features described in FIGS. 1A-1C, other drawing figures, and/or the accompanying disclosure, even though such combination or combinations are not explicitly illustrated herein. Similarly, additional features not limited to the examples presented, may be combined with some or all of the features shown and described herein.

In FIGS. 14-16, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 14-16 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1A and particularly to, e.g., FIGS. 3A, 3B, 5A, 5B, 6, and 9, applicator 102 for delivering glutinous substance 168 to workpiece 170 from end-effector 101 is disclosed. Applicator 102 comprises body 110, comprising first channel 115 that comprises inlet portion 180, comprising inlet 116 through which glutinous substance 168 enters applicator 102, and outlet portion 182, comprising outlet 117, through which glutinous substance 168 exits outlet portion 182. Inlet portion 180 is communicatively coupled with outlet portion 182 and at least a part of inlet portion 180 is oriented at an angle to outlet portion 182. The angle is other than 180 degrees. Body 110 also comprises second channel 184, communicatively coupled with first channel 115 and coaxial with outlet portion 182 of first channel 115. Additionally, body 110 comprises sensor port 140, communicatively coupled with first channel 115. Applicator 102 also comprises plunger 186, comprising gate 118. Gate 118 is movable within outlet portion 182 of first channel 115 between, inclusively, an open position, allowing glutinous substance 168 to flow from inlet 116 of first channel 115 to outlet 117 of first channel 115 and a closed position, preventing glutinous substance 168 from flowing from inlet 116 of first channel 115 to outlet 117 of first channel 115. Applicator 102 further comprises actuator 131, selectively operable to move plunger 186 such that gate 118 moves between, inclusively, the open position and the closed position. Applicator 102 additionally comprises sensor 141, communicatively coupled with first channel 115 via sensor port 140 and configured to detect at least one characteristic of glutinous substance 168 in first channel 115. The preceding subject matter of this paragraph characterizes example 1 of the present disclosure.

At least the part of inlet portion 180 of first channel 115, being oriented at an angle to outlet portion 182 of first channel 115, allows end-effector 101 to more conveniently locate applicator 102 relative to workpiece 170 for delivering glutinous substance 168 to workpiece 170. For example, orienting at least the part of inlet portion 180 of first channel 115 at an angle to outlet portion 182 of first channel 115 facilitates delivery of glutinous substance 168 to features of workpiece 170 (e.g., the overhangs, pockets, channels, and other tight spaces) that would be difficult to reach if inlet portion 180 of first channel 115 was not at an angle to outlet portion 182 of first channel 115. Additionally, at least the part of inlet portion 180 of first channel 115, being oriented at an angle to outlet portion 182 of first channel 115, allows inlet 116 of inlet portion 180 of first channel 115 to be offset from outlet 117 of outlet portion 182 of first channel 115, which provides spacing for actuator 131 to be coupled to body 110 in-line with outlet 117 of outlet portion 182.

Sensor port 140, being communicatively coupled with first channel 115, promotes placement of sensor 141 close to outlet 117 of outlet portion 182 of first channel 115, which helps to more accurately detect at least one characteristic of glutinous substance 168 at outlet 117 of outlet portion 182 of first channel 115. Accurately detecting at least one characteristic of glutinous substance 168 at outlet 117 facilitates appropriate rates of delivery of glutinous substance 168 from outlet 117 of outlet portion 182 of first channel 150, via control of actuator 131, because detected characteristics better reflect the actual characteristics of glutinous substance 168 at outlet 117 compared to sensor 141 placed further away from outlet 117, such as sensor 141 positioned upstream of applicator 102.

According to one example, actuator 131 can be any of various linear actuators, such as a pneumatically-powered linear actuator with a double-acting piston configuration. Further, body 110 of applicator 102 can include an interface for mating with end-effector 101.

Referring generally to FIG. 1A and particularly to, e.g., FIGS. 3A, 3B, 5A, 5B, 6, and 9, sensor 141 is communicatively coupled with inlet portion 180 of first channel 115. The preceding subject matter of this paragraph characterizes example 2 of the present disclosure, wherein example 2 also includes the subject matter according to example 1, above.

Communicatively coupling sensor 141 with inlet portion 180 of first channel 115 facilitates reliable detection of at least one characteristic of glutinous substance 168 in applicator 102 by detecting at least one characteristic of glutinous substance 168 upstream of outlet portion 182 of first channel 115 so as to avoid flow interruptions of glutinous substance 168 in outlet portion 182 of first channel 115 associated with actuation of plunger 186 by actuator 131.

Referring generally to FIG. 1A and particularly to, e.g., FIGS. 5A-7B, 9, and 13A-13C, sensor port 140 is configured to releasably retain sensor 141. The preceding subject matter of this paragraph characterizes example 3 of the present disclosure, wherein example 3 also includes the subject matter according to any one of examples 1 to 2, above.

Releasably retaining sensor 141 with sensor port 140 allows sensor 141 to be quickly and easily decoupled from body 110 and coupled to body 110, which can be useful when body 110 is treated as disposable or when body 110 is replaced with a new body. For example, when body 110 is treated as disposable, sensor 141 can be easily decoupled from body 110, to preserve sensor 141, before body 110 is discarded. Likewise, after sensor 141 is decoupled, sensor 141 can be easily coupled to a new or replacement body for subsequent use. In other words, in view of the foregoing, sensor 141 is not tied to one particular body 110, but rather the same sensor 141 can be used or interchangeable with multiple bodies 110.

According to one example, sensor port 140 releasably retains sensor 141 via a threaded engagement. In another example, sensor port 140 releasably retains sensor 141 via a snap-fit engagement. According to yet a further example, sensor port 140 releasably retains sensor 141 via a twist-and-lock engagement, which includes an angled slot that receives and retains a pin of sensor 141. In an additional example, sensor port 140 releasably retains sensor 141 via any of various fastening arrangements, such as those including one or more of nuts, bolts, clamps, and the like.

Referring generally to FIG. 1A and particularly to, e.g., FIGS. 2, 4-5B, 7A-8A, 8C, 8E, and 9, applicator 102 further comprises second sensor 141a, communicatively coupled with first channel 115. Sensor 141 is configured to detect a first characteristic of glutinous substance 168. Second sensor 141a is configured to detect a second characteristic of glutinous substance 168. First characteristic of glutinous substance 168 is different than the second characteristic of glutinous substance 168. The preceding subject matter of this paragraph characterizes example 4 of the present disclosure, wherein example 4 also includes the subject matter according to any one of examples 1 to 3, above.

Detecting a first characteristic of glutinous substance 168, with sensor 141, that is different than a second characteristic of glutinous substance 168 detected by second sensor 141a promotes more precise and effective control of delivery of glutinous substance 168 from applicator 102 to workpiece 170. For example, knowledge of two different characteristics of glutinous substance 168 provides a better prediction of the flow characteristics of glutinous substance 168 through and from applicator 102 than a single characteristic.

Referring generally to FIG. 1A and particularly to, e.g., FIGS. 2, 4-5B, 7A-8A, 8C, 8E, and 9, first characteristic of glutinous substance 168 is temperature and second characteristic of glutinous substance 168 is pressure. The preceding subject matter of this paragraph characterizes example 5 of the present disclosure, wherein example 5 also includes the subject matter according to example 4, above.

The temperature and pressure of glutinous substance 168 affect the flow characteristics (e.g., viscosity) of glutinous substance 168. Accordingly, detecting the temperature and pressure of glutinous substance 168 helps to predict the flow characteristics of glutinous substance 168 in first channel 115 of body 110.

Referring generally to FIG. 1A and particularly to, e.g., FIGS. 5A, 5B, 7A, 7B, and 9, body 110 further comprises second sensor port 140a, communicatively coupled with first channel 115. Second sensor 141a is communicatively coupled with first channel 115 via second sensor port 140a. Sensor 141 is releasably retained by sensor port 140 and second sensor 141a is releasably retained by second sensor port 140a. The preceding subject matter of this paragraph characterizes example 6 of the present disclosure, wherein example 6 also includes the subject matter according to any one of examples 4 to 5, above.

Releasably retaining second sensor 141a with second sensor port 140a allows second sensor 141a to be easily decoupled from body 110 and coupled to body 110, which can be useful when body 110 is treated as disposable or when body 110 is replaced with a new body. For example, when body 110 is treated as disposable, second sensor 141a can be easily decoupled from body 110, to preserve second sensor 141a, before body 110 is discarded. Likewise, second sensor 141a can be easily coupled to a new or replacement body for subsequent use. In other words, in view of the foregoing, second sensor 141a is not tied to one particular body 110, but rather the same second sensor 141a can be used or interchangeable with multiple bodies 110.

Furthermore, releasably retaining sensor 141 with sensor port 140a and second sensor 141a with separate second sensor port 140a allows sensor 141 to be coupled to and decoupled from body 110 independently of second sensor 141a.

According to one example, second sensor port 140a releasably retains second sensor 141a via a threaded engagement. In another example, second sensor port 140a releasably retains second sensor 141a via a snap-fit engagement. According to yet a further example, second sensor port 140a releasably retains second sensor 141a via a twist-and-lock engagement, which includes an angled slot that receives and retains a pin of second sensor 141a. In an additional example, second sensor port 140a releasably retains second sensor 141s via any of various fastening arrangements, such as those including one or more of nuts, bolts, clamps, and the like.

Referring generally to FIG. 1A and particularly to, e.g., FIGS. 5A-7B, 9, and FIGS. 13A-13C, sensor port 140 is configured differently than second sensor port 140a. The preceding subject matter of this paragraph characterizes example 7 of the present disclosure, wherein example 7 also includes the subject matter according to example 6, above.

Sensor port 140 and second sensor port 140a, being configured differently than each other, facilitate the retention of differently configured sensors to sensor port 140 and second sensor port 140a, respectively.

Referring generally to FIG. 1A and particularly to, e.g., FIGS. 5A-7B, 9, and FIGS. 13A-13C, sensor port 140 and second sensor port 140a are angularly offset from each other. The preceding subject matter of this paragraph characterizes example 8 of the present disclosure, wherein example 8 also includes the subject matter according to any one of examples 6 to 7, above.

Angularly offsetting sensor port 140 from second sensor port 140a facilitates close proximity of sensor port 140 and second sensor port 140a on body 110. With sensor port 140 and second sensor port 140a in close proximity on body 110, sensor 141 and second sensor 141a can detect characteristics of glutinous substance 168 at the same approximate location within first channel 115, which promotes an accurate relationship between characteristics of glutinous substance 168 detected by sensor 141 and second sensor 141a.

Referring generally to FIG. 1A and particularly to, e.g., FIGS. 5A, 5B, 6, and 9, the angle, at which at least the part of inlet portion 180 of first channel 115 is oriented relative to outlet portion 182 of first channel 115, is greater than 90 degrees. The preceding subject matter of this paragraph characterizes example 9 of the present disclosure, wherein example 9 also includes the subject matter according to any one of examples 1 to 8, above.

Orienting at least the part of inlet portion 180 of first channel 115 at an angle greater than 90 degrees relative to outlet portion 182 of first channel 115 promotes the benefits of angling inlet portion 180 of first channel 115 relative to outlet portion 182 of first channel 115 presented above, while helping to reduce flow restriction of glutinous substance 168 at the transition from inlet portion 180 to outlet portion 182.

Referring generally to FIG. 1A and particularly to, e.g., FIGS. 5A, 5B, 6, and 9, the angle, at which at least the part of inlet portion 180 of first channel 115 is oriented relative to outlet portion 182 of first channel 115, is less than 90 degrees. The preceding subject matter of this paragraph characterizes example 10 of the present disclosure, wherein example 10 also includes the subject matter according to any one of examples 1 to 8, above.

Orienting at least the part of inlet portion 180 of first channel 115 at an angle less than 90 degrees relative to outlet portion 182 of first channel 115 promotes the benefits of angling inlet portion 180 of first channel 115 relative to outlet portion 182 of first channel 115 presented above, while helping to reduce flow restriction of glutinous substance 168 at the transition from inlet portion 180 to outlet portion 182.

Referring generally to FIG. 1A and particularly to, e.g., FIGS. 3A and 3B, the angle, at which at least the part of inlet portion 180 of first channel 115 is oriented relative to outlet portion 182 of first channel 115, is 90 degrees. The preceding subject matter of this paragraph characterizes example 11 of the present disclosure, wherein example 11 also includes the subject matter according to any one of examples 1 to 8, above.

Orienting at least the part of inlet portion 180 of first channel 115 at an angle of 90 degrees relative to outlet portion 182 of first channel 115 promotes the ability of end-effector 101 to locate applicator 102 relative to tight spaces of workpiece 170 for delivering glutinous substance 168 to the tight spaces.

Referring generally to FIG. 1A and particularly to, e.g., FIGS. 5A, 5B, and 9, a first part of inlet portion 180 of first channel 115 is oblique to outlet portion 182 of first channel 115 and a second part of inlet portion 180 of first channel 115 is parallel to outlet portion 182 of first channel 115. The first part of inlet portion 180 of first channel 115 is between the second part of inlet portion 180 of first channel 115 and outlet portion 182 of first channel 115. The preceding subject matter of this paragraph characterizes example 12 of the present disclosure, wherein example 12 also includes the subject matter according to any one of examples 1 to 8, above.

The first part of inlet portion 180, being oblique to outlet portion 182, and the second part of inlet portion 180 being parallel to outlet portion 182 allows end-effector 101 to be in-line with outlet portion 162 of first channel 115 while also allowing inlet 116 of inlet portion 180 of first channel 115 to be offset from outlet 117 of outlet portion 182.

Referring generally to FIG. 1A and particularly to, e.g., FIGS. 3A, 3B, 5A, 5B, 7A, 7B, and 9, plunger 186 further comprises plug 188, movable within second channel 184 and configured to prevent glutinous substance 168 from flowing from first channel 115 into second channel 184. The preceding subject matter of this paragraph characterizes example 13 of the present disclosure, wherein example 13 also includes the subject matter according to any one of examples 1 to 12, above.

Plug 188 of plunger 186, by preventing glutinous substance 168 from flowing from first channel 115 into second channel 184, ensures glutinous substance 168 does not come into contact with actuator 131 via second channel 184. In one example, plug 188 sealingly engages second channel 184 to form a seal that is maintained as plug 188 moves within second channel 184. At least a portion of plug 188 can be made of a compliant material to facilitate a seal between plug 188 and second channel 184.

Referring generally to FIG. 1A and particularly to, e.g., FIGS. 2-8A, 8C, 8E, 9, and 10, body 110 further comprises actuator interface 130. Actuator 131 is coupled to actuator interface 130 of body 110. The preceding subject matter of this paragraph characterizes example 14 of the present disclosure, wherein example 14 also includes the subject matter according to any one of examples 1 to 13, above.

Actuator interface 130 facilitates releasable coupling of actuator 131 to body 110. Releasably coupling actuator 131 to body 110 allows actuator 131 to be quickly and easily decoupled from body 110 and coupled to body 110, which can be useful when body 110 is treated as disposable or when body 110 is replaced with a new body. For example, when body 110 is treated as disposable, actuator 131 can be easily decoupled from body 110, to preserve actuator 131, before body 110 is discarded. Likewise, after actuator 141 is decoupled, actuator 141 can be easily coupled to a new or replacement body for subsequent use. In other words, in view of the foregoing, actuator 131 is not tied to one particular body 110, but rather the same actuator 131 can be used or interchangeable with multiple bodies 110.

Referring generally to FIG. 1A and particularly to, e.g., FIGS. 2-8A, 8C, 8E, 9, and 10A, actuator 131 is configured to releasably interlock with actuator interface 130 of body 110 without using tools. The preceding subject matter of this paragraph characterizes example 15 of the present disclosure, wherein example 15 also includes the subject matter according to example 14, above.

Releasably interlocking actuator 131 with actuator interface 130 without tools, such as by hand, facilitates quick, easy, and simple coupling of actuator 131 to and decoupling of actuator 131 from body 110.

Referring generally to FIG. 1A and particularly to, e.g., FIGS. 2, 4, 7A-8A, 8C, 8E, and 10A, actuator interface 130 comprises slots 171. Actuator 131 comprises pins 173, configured to be simultaneously laterally insertable into slots 171. The preceding subject matter of this paragraph characterizes example 16 of the present disclosure, wherein example 16 also includes the subject matter according to any one of examples 14 to 15, above.

Simultaneous lateral insertion of pins 173 of actuator 131 into slots 171 of actuator interface 130 promotes secure releasable coupling of actuator 131 to body 110. For example, slots 171 of actuator interface 130 can be positioned in a spaced apart manner about a first axis and pins 173 of actuator 131 can be similarly positioned in a spaced apart manner about a second axis in a manner that complements the slots 171. In such an example, with the first axis and the second axis being coaxial and pins 173 being laterally adjacent respective slots 171, actuator 131 can be rotated, relative to actuator interface 130 and in a first rotational direction, about the second axis to simultaneously laterally insert pins 173 into respective slots 171, which releasably couples actuator 131 to actuator interface 130. When releasably coupled to actuator interface 130, actuator 131 can be rotated, relative to actuator interface 130 and in a second rotational direction opposite the first rotational direction, about the second axis to simultaneously laterally remove pins 173 from respective slots 171, which releasably decouples actuator 131 from actuator interface 130.

Referring generally to FIG. 1A and particularly to, e.g., FIGS. 3A, 3B, 5A-6, and 9, inlet portion 180 of first channel 115 has a cross-sectional area that is constant along a length of first channel 115 that is between inlet portion 180 of first channel 115 and outlet portion 182 of first channel 115. The preceding subject matter of this paragraph characterizes example 17 of the present disclosure, wherein example 17 also includes the subject matter according to any one of examples 1 to 16, above.

The cross-sectional area of inlet portion 180 of first channel 115, being constant along a length of first channel 115, helps to reduce flow restriction of glutinous substance 168 within first channel 115.

Referring generally to FIG. 1A and particularly to, e.g., FIGS. 3A, 3B, 5A-6, and 9, at least a part of outlet portion 182 of first channel 115 converges toward outlet 117 of first channel 115. The preceding subject matter of this paragraph characterizes example 18 of the present disclosure, wherein example 18 also includes the subject matter according to any one of examples 1 to 17, above.

Converging at least a part of outlet portion 182 of first channel 115 toward outlet 117 of first channel 115 facilitates predictable, uniform flow of glutinous substance 168 from outlet 117 of first channel 115.

Referring generally to FIG. 1A and particularly to, e.g., FIGS. 3A, 3B, 5A-6, and 9, outlet portion 182 of first channel 115 comprises constriction 175. Gate 118 of plunger 186 is sealingly engaged with constriction 175 when gate 118 is in the closed position, preventing glutinous substance 168 from flowing from inlet 116 of first channel 115 to outlet 117 of first channel 115. The preceding subject matter of this paragraph characterizes example 19 of the present disclosure, wherein example 19 also includes the subject matter according to any one of examples 1 to 18, above.

Constriction 175 of outlet portion 182 of first channel 115 facilitates flow of glutinous substance 168 through outlet portion 182 of first channel 115 and around gate 118 of plunger 186 when plunger 186 is in the open position and facilitates obstruction of flow of glutinous substance 168 through outlet portion 182 when plunger 186 is in the closed position and sealingly engaged with constriction 175. At least a portion of gate 118 of plunger 186 can be made of a compliant material to facilitate a seal between gate 118 and constriction 175 when plunger 186 is in the closed position and gate 118 is within constriction 175.

Referring generally to FIG. 1A and particularly to, e.g., FIGS. 2-8A, 8C, 8E, 9, 10A, and 13A-13C, body 110 has a one-piece monolithic construction. The preceding subject matter of this paragraph characterizes example 20 of the present disclosure, wherein example 20 also includes the subject matter according to any one of examples 1 to 19, above.

One-piece monolithic construction of body 110 promotes ease in assembly of applicator 102. Additionally, body 110, having a one-piece monolithic construction, facilitates disposability of body 110. For example, body 110 can be made of relatively inexpensive materials, such as plastics, using a molding process or additive manufacturing process. In some examples, after applicator 102 is used to deliver glutinous substance 168 to workpiece 170 from end-effector 101, applicator 102 can be decoupled from end-effector 101, actuator 131 and sensor 141 can be decoupled from body 110, and body 110 can be discarded. Then, a new or replacement body 110 can be coupled to end-effector 101, and actuator 131 and sensor 141 can be coupled to the new or replacement body 110 in advance of delivering glutinous substance 168 to workpiece 170 from end-effector 101 with applicator 102 having the new or replacement body 110.

Referring generally to FIG. 1A and particularly to, e.g., FIGS. 3A, 3B, 5A, 5B, 6, and 9, system 100 for delivering glutinous substance 168 to workpiece 170 from end-effector 101 is disclosed. System 100 comprises applicator 102, coupled to end-effector 101, comprising body 110. Body 110 comprises first channel 115 that comprises inlet portion 180, comprising inlet 116 through which glutinous substance 168 enters applicator 102, and outlet portion 182, comprising outlet 117, through which glutinous substance 168 exits outlet portion 182. Inlet portion 180 is communicatively coupled with outlet portion 182 and at least a part of the inlet portion 180 is oriented at an angle to the outlet portion 182, where the angle is other than 180 degrees. Body 110 also comprises second channel 184, communicatively coupled with first channel 115 and coaxial with outlet portion 182 of first channel 115. Body 110 further comprises sensor port 140, communicatively coupled with first channel 115. Applicator 102 also comprises plunger 186, comprising gate 118. Gate 118 is movable within outlet portion 182 of first channel 115 between, inclusively, an open position, allowing glutinous substance 168 to flow from inlet 116 of first channel 115 to outlet 117 of first channel 115 and a closed position, preventing glutinous substance 168 from flowing from inlet 116 of first channel 115 to outlet 117 of first channel 115. Applicator 102 further comprises actuator 131, selectively operable to move plunger 186 such that gate 118 moves between, inclusively, the open position and the closed position. Additionally, applicator 102 comprises sensor 141, communicatively coupled with first channel 115 via sensor port 140 and configured to detect at least one characteristic of glutinous substance 168 in first channel 115 and to generate output corresponding to at least the one characteristic of glutinous substance 168. System 100 also comprises controller 105, operatively coupled with sensor 141 of applicator 102 and with actuator 131 of applicator 102. Controller 105 is configured to regulate a rate, at which glutinous substance 168 flows from outlet 117 of first channel 115 of body 110 of applicator 102, by controlling operation of actuator 131 of applicator 102, responsive to, at least in part, the output received from sensor 141. The preceding subject matter of this paragraph characterizes example 21 of the present disclosure.

At least the part of inlet portion 180 of first channel 115, being oriented at an angle to outlet portion 182 of first channel 115, allows end-effector 101 to more conveniently locate applicator 102 relative to workpiece 170 for delivering glutinous substance 168 to workpiece 170. For example, orienting at least the part of inlet portion 180 of first channel 115 at an angle to outlet portion 182 of first channel 115 facilitates delivery of glutinous substance 168 to features of workpiece 170 (e.g., the overhangs, pockets, channels, and other tight spaces) that would be difficult to reach if inlet portion 180 of first channel 115 was not at an angle to outlet portion 182 of first channel 115. Additionally, at least the part of inlet portion 180 of first channel 115, being oriented at an angle to outlet portion 182 of first channel 115, allows inlet 116 of inlet portion 180 of first channel 115 to be offset from outlet 117 of outlet portion 182 of first channel 115, which provides spacing for actuator 131 to be coupled to body 110 in-line with outlet 117 of outlet portion 182.

Sensor port 140, being communicatively coupled with first channel 115, promotes placement of sensor 141 close to outlet 117 of outlet portion 182 of first channel 115, which helps to more accurately detect at least one characteristic of glutinous substance 168 at outlet 117 of outlet portion 182 of first channel 115. Accurately detecting at least one characteristic of glutinous substance 168 at outlet 117 facilitates appropriate rates of delivery of glutinous substance 168 from outlet 117 of outlet portion 182 of first channel 150, via control of actuator 131, because detected characteristics better reflect the actual characteristics of glutinous substance 168 at outlet 117 compared to sensor 141 placed further away from outlet 117, such as sensor 141 positioned upstream of applicator 102.

Controller 105, controlling operation of actuator 131 of applicator 102, responsive to, at least in part, output received from sensor 141 promotes precision, consistency, and quality of the flow of glutinous substance 168 from outlet 117. In other words, controlling the rate of flow of glutinous substance 168 from outlet 117 of first channel 115 of body 110 of actuator 102, responsive to, at least in part, the output received from sensor 141 facilitates a precise, consistent, and quality application of glutinous substance 168 to workpiece 170.

Referring generally to, e.g., FIG. 1A and particularly to FIGS. 2, 4-5B, 7A-8A, 8C, 8E, and 9, at least the one characteristic of glutinous substance 168 comprises at least one of temperature of glutinous substance 168 or pressure of glutinous substance 168. The preceding subject matter of this paragraph characterizes example 22 of the present disclosure, wherein example 22 also includes the subject matter according to example 21, above.

The temperature and pressure of glutinous substance 168 affect the flow characteristics (e.g., viscosity) of glutinous substance 168. Accordingly, detecting the temperature and pressure of glutinous substance 168 helps to predict the flow characteristics of glutinous substance 168 in first channel 115 of body 110.

Referring generally to, e.g., FIG. 1A and particularly to FIGS. 3A, 3B, 5A, 5B, 6, and 9, controller 105, responsive to, at least in part, the output from sensor 141, indicating a change in at least the one characteristic of glutinous substance 168, regulates the rate at which glutinous substance 168 flows through outlet 117 of first channel 115 of body 110 of applicator 102 by causing actuator 131 of applicator 102 to move gate 118 of plunger 186 between, inclusively, the open position, allowing glutinous substance 168 to flow from inlet 116 of first channel 115 to outlet 117 of first channel 115 and the closed position, preventing glutinous substance 168 from flowing from inlet 116 of first channel 115 to outlet 117 of first channel 115. The preceding subject matter of this paragraph characterizes example 23 of the present disclosure, wherein example 23 also includes the subject matter according to any one of examples 21 to 22, above.

Regulating the rate at which glutinous substance 168 flows through outlet 117 of first channel 115 of body 110 responsive to, at least in part, a change in at least the one characteristic of glutinous substance 168, promotes consistency in glutinous substance 168 delivered to workpiece 170 despite changes to characteristics of glutinous substance 168.

Referring generally to, e.g., FIGS. 3A, 3B, 5A, 5B, 6, and 9 and particularly to FIG. 14, method 200 of delivering glutinous substance 168 to workpiece 170 from end-effector 101 is disclosed. Method 200 comprises (block 202) using end-effector 101 to position applicator 102 relative to workpiece 170. Applicator 102 comprises body 110, comprising first channel 115 that comprises inlet portion 180, comprising inlet 116 through which glutinous substance 168 enters applicator 102, and outlet portion 182, comprising outlet 117, through which glutinous substance 168 exits outlet portion 182. Inlet portion 180 is communicatively coupled with outlet portion 182 and at least a part of the inlet portion 180 is oriented at an angle to the outlet portion (182), where the angle is other than 180 degrees. Body 110 also comprises second channel 184, communicatively coupled with first channel 115 and coaxial with outlet portion 182 of first channel 115. Additionally, body 110 comprises sensor port 140, communicatively coupled with first channel 115. Applicator 102 further comprises plunger 186, comprising gate 118. Gate 118 is movable within outlet portion 182 of first channel 115 between, inclusively, an open position, allowing glutinous substance 168 to flow from inlet 116 of first channel 115 to outlet 117 of first channel 115 and a closed position, preventing glutinous substance 168 from flowing from inlet 116 of first channel 115 to outlet 117 of first channel 115. Also, applicator 102 comprises actuator 131, selectively operable to move plunger 186 such that gate 118 moves between, inclusively, the open position and closed position. Additionally, applicator 102 comprises sensor 141, communicatively coupled with first channel 115 via sensor port 140 and configured to detect at least one characteristic of glutinous substance 168 in first channel 115 and to generate output corresponding to at least the one characteristic of the glutinous substance. Method 200 also comprises (block 204) urging glutinous substance 168 from end-effector 101 through first channel 115 of body 110 of applicator 102 from inlet 116 of first channel 115 toward outlet 117 of first channel 115. Furthermore, method 200 comprises (block 206) selectively operating actuator 131 of applicator 102 to regulate a rate at which glutinous substance 168 flows through first channel 115 of body 110 of applicator 102 responsive to, at least in part, the output received from sensor 141. The preceding subject matter of this paragraph characterizes example 24 of the present disclosure.

At least the part of inlet portion 180 of first channel 115, being oriented at an angle to outlet portion 182 of first channel 115, allows end-effector 101 to more conveniently locate applicator 102 relative to workpiece 170 for delivering glutinous substance 168 to workpiece 170. For example, orienting at least the part of inlet portion 180 of first channel 115 at an angle to outlet portion 182 of first channel 115 facilitates delivery of glutinous substance 168 to features of workpiece 170 (e.g., the overhangs, pockets, channels, and other tight spaces) that would be difficult to reach if inlet portion 180 of first channel 115 was not at an angle to outlet portion 182 of first channel 115. Additionally, at least the part of inlet portion 180 of first channel 115, being oriented at an angle to outlet portion 182 of first channel 115, allows inlet 116 of inlet portion 180 of first channel 115 to be offset from outlet 117 of outlet portion 182 of first channel 115, which provides spacing for actuator 131 to be coupled to body 110 in-line with outlet 117 of outlet portion 182.

Sensor port 140, being communicatively coupled with first channel 115, promotes placement of sensor 141 close to outlet 117 of outlet portion 182 of first channel 115, which helps to more accurately detect at least one characteristic of glutinous substance 168 at outlet 117 of outlet portion 182 of first channel 115. Accurately detecting at least one characteristic of glutinous substance 168 at outlet 117 facilitates appropriate rates of delivery of glutinous substance 168 from outlet 117 of outlet portion 182 of first channel 150, via control of actuator 131, because detected characteristics better reflect the actual characteristics of glutinous substance 168 at outlet 117 compared to sensor 141 placed further away from outlet 117, such as sensor 141 positioned upstream of applicator 102.

Selectively operating actuator 131 of applicator 102 to regulate the rate at which glutinous substance 168 flows through first channel 115, responsive to, at least in part, output received from sensor 141 promotes precision, consistency, and quality of the flow of glutinous substance 168 from outlet 117. In other words, controlling the rate of flow of glutinous substance 168 from outlet 117 of first channel 115 of body 110 of actuator 102, responsive to, at least in part, the output received from sensor 141 facilitates a precise, consistent, and quality application of glutinous substance 168 to workpiece 170.

Referring generally to, e.g., FIGS. 3A, 3B, 5A, 5B, 6, and 9 and particularly to FIG. 14, according to method 200, (clock 208) selectively operating actuator 131 of applicator 102 to regulate the rate at which glutinous substance 168 flows through first channel 115 of body 110 of applicator 102 comprises causing actuator 131 of applicator 102 to move gate 118 of plunger 186 between, inclusively, the open position, allowing glutinous substance 168 to flow from inlet 116 of first channel 115 to outlet 117 of first channel 115 and the closed position, preventing glutinous substance 168 from flowing from inlet 116 of first channel 115 to outlet 117 of first channel 115, responsive to, at least in part, output from sensor 141 indicating a change in at least the one characteristic of glutinous substance 168 detected by sensor 141. The preceding subject matter of this paragraph characterizes example 25 of the present disclosure, wherein example 25 also includes the subject matter according to example 24, above.

Regulating the rate at which glutinous substance 168 flows through outlet 117 of first channel 115 of body 110 responsive to, at least in part, a change in at least the one characteristic of glutinous substance 168, promotes consistency in glutinous substance 168 delivered to workpiece 170 despite changes to characteristics of glutinous substance 168.

Referring generally to, e.g., FIG. 1A and particularly to FIGS. 2, 4, 7A-8G, 10A, and 13A-13C, applicator 102 for delivering glutinous substance 168 to workpiece 170 from end-effector 101 is disclosed. Applicator 102 comprises body 110 that comprises first channel 115. First channel 115 comprises inlet portion 180 and outlet portion 182. Inlet portion 180 of first channel 115 comprises inlet 116, through which glutinous substance 168 enters applicator 102. Inlet portion 180 of first channel 115 is communicatively coupled with outlet portion 182 of first channel 115. Outlet portion 182 of first channel 115 comprises outlet 117, through which glutinous substance 168 exits applicator 102. Applicator 102 also comprises tip 160, configured to be releasably attached to body 110. Tip 160 comprises through cavity 162, communicatively coupled with outlet portion 182 of first channel 115 of body 110 when tip 160 is coupled with body 110. Applicator 102 further comprises coupler 154, configured to releasably attach tip 160 to body 110 by interlocking with tip 160 and with body 110 such that coupler 154 has no more than three degrees of freedom relative to tip 160 and body 110. Applicator 102 additionally comprises retainer 156, configured to maintain coupler 154 interlocked with body 110 and with tip 160. The preceding subject matter of this paragraph characterizes example 26 of the present disclosure.

Tip 160, being configured to be releasably attached to body 110, facilitates interchangeability of tips with body 110. For example, tips 160 of different sizes and shapes, each configured to apply glutinous substance 168 to workpiece 170 differently, can be releasably attached to body 110 in response to application constraints associated with workpiece 170. Such interchangeability of tips 160 promotes the ability to apply glutinous substance 168 to workpiece 170 differently with one body 110. Using one body 110 and multiple, interchangeable tips 160, to apply glutinous substance 168 to workpiece differently facilitates a reduction in manufacturing delays and costs. For example, body 110 can be made of a material that is different (e.g., more expensive or more easy to manufacture) than that of tip 160. Coupler 154, interlocking with tip 160 and with body 110 such that coupler 154 has no more than three degrees of freedom relative to tip 160 and body 110, promotes fixation of tip 160 to body 110. Moreover, coupler 154 allows tip 160 to be both sufficiently interlocked with body 110, for applying glutinous substance 168 to workpiece 170, and releasable from body 110, for quick and easy removal of tip 160 from body 110 after glutinous substance 168 is applied to workpiece 170 from tip 160. Retainer 156 ensures that coupler 154 both remains interlocked with body 110 and with tip 160, while tip 160 is used to apply glutinous substance 168 to workpiece 170, and allows release of tip 160 from body 110 when removal of tip 160 from body 110 is desired.

Referring generally to, e.g., FIG. 1A and particularly to FIGS. 2, 4, 7A-9, 10A, and 13C, body 110 further comprises tip-interface portion 150, defining outlet 117 of first channel 115. Tip-interface portion 150 of body 110 is inserted into through cavity 162 of tip 160 when tip 160 is releasably attached to body 110. The preceding subject matter of this paragraph characterizes example 27 of the present disclosure, wherein example 27 also includes the subject matter according to example 26, above.

Tip-interface portion 150 promotes a secure fit between body 110 and tip 160 when tip 160 is releasably attached to body 110.

Referring generally to, e.g., FIG. 1A and particularly to FIGS. 2, 4, 7A-9, 10A, and 13C, tip-interface portion 150 of body 110 comprises external tapered surface 163, having a first taper. Through cavity 162 of tip 160 comprises internal tapered surface 165, having a second taper. External tapered surface 163 of tip-interface portion 150 of body 110 is in complementary engagement with internal tapered surface 165 of through cavity 162 of tip 160 when tip 160 is releasably attached to body 110. The preceding subject matter of this paragraph characterizes example 28 of the present disclosure, wherein example 28 also includes the subject matter according to example 27, above.

Complementary engagement between external tapered surface 163 of tip-interface portion 150 of body 110 and internal tapered surface 165 of through cavity 162 of tip 160 promotes a tight fit between body 110 and tip 160. Additionally, external tapered surface 163 and internal tapered surface 165, being tapered, assists with the axial alignment of tip 160 relative to tip-interface portion 150 during installation of tip 160 onto tip-interface portion 150. For example, as tip-interface portion 150 of body is received within through cavity 162 of tip 160, engagement of external tapered surface 163 and internal tapered surface 165 can help to reposition tip 160 relative to tip-interface portion 150, if tip 160 is initially axially misaligned relative to tip-interface portion 150, such that tip 160 becomes axially aligned with tip-interface portion 150.

Referring generally to, e.g., FIG. 1A and particularly to FIGS. 2, 4, 7A-9, 10A, and 13C, first taper of external tapered surface 163 of tip-interface portion 150 of body 110 is the same as second taper of internal tapered surface 165 of through cavity 162 of tip 160. The preceding subject matter of this paragraph characterizes example 29 of the present disclosure, wherein example 29 also includes the subject matter according to example 28, above.

First taper of external tapered surface 163 of tip-interface portion 150 of body 110 being the same as second taper of internal tapered surface 165 of through cavity 162 of tip 160 promotes complementary engagement between external tapered surface 163 of tip-interface portion 150 and internal tapered surface 165 of through cavity 162.

Referring generally to, e.g., FIG. 1A and particularly to FIGS. 2, 4, 7A-9, 10A, and 13C, external tapered surface 163 of tip-interface portion 150 of body 110 and internal tapered surface 165 of through cavity 162 of tip 160 are conically shaped. The preceding subject matter of this paragraph characterizes example 30 of the present disclosure, wherein example 30 also includes the subject matter according to any one of examples 28 to 29, above.

The conical shape of external tapered surface 163 of tip-interface portion 150 of body 110 and internal tapered surface 165 of through cavity 162 of tip 160 promotes ease in axially aligning tip 160 relative to tip-interface portion 150, during installation of tip 160 onto tip-interface portion 150. Additionally, the conical shape of external tapered surface 163 and internal tapered surface 165 facilitates slidable insertion of tip-interface 150 into through cavity 162 of tip 160. Furthermore, the conical shape of external tapered surface 163 and internal tapered surface 165 allows co-rotation between tip-interface portion 150 and tip 160, which facilitates rotational adjustments for rotationally aligning tip-interface portion 150 and tip 160.

Referring generally to, e.g., FIG. 1A and particularly to FIG. 9, tip 160 further comprises gasket 167 within through cavity 162. Gasket 167 forms a seal between tip-interface portion 150 of body 110 and tip 160 when tip 160 is releasably attached to body 110. The preceding subject matter of this paragraph characterizes example 31 of the present disclosure, wherein example 31 also includes the subject matter according to any one of examples 27 to 30, above.

Gasket 167, forming a seal between tip-interface portion 150 of body 110 and tip 160, helps to ensure glutinous substance 168 in first channel 115 of body 110 and through cavity 162 of tip 160 does not leak through the interface between tip-interface portion 150 of body 110 and tip 160.

In one example 167, gasket 167 can be an O-ring, or other mechanical seal, made from a compliant material, such as rubber, silicone, plastic polymer, or the like.

Referring generally to, e.g., FIG. 1A and particularly to FIGS. 2 and 7A-8G, body 110 further comprises one of tooth 157 or notch 159. When body 110 comprises tooth 157, tip 160 further comprises notch 159. When body 110 comprises notch 159, tip 160 further comprises tooth 157. When tip 160 is coupled with body 110, tooth 157 is received into notch 159. The preceding subject matter of this paragraph characterizes example 32 of the present disclosure, wherein example 32 also includes the subject matter according to any one of examples 26 to 31, above.

Tooth 157, being received into notch 159, promotes rotational alignment between tip-interface portion 150 of body 110 and tip 160 during installation of tip 160 onto tip-interface portion 150. Furthermore, tooth 157 and notch 159 help to ensure that coupler 154 does not releasably attach tip 160 to body 110 until tip 160 is rotationally aligned with tip-interface portion 150.

Referring generally to, e.g., FIG. 1A and particularly to FIGS. 2 and 7A-8G, tooth 157 and notch 159 are wedge-shaped. The preceding subject matter of this paragraph characterizes example 33 of the present disclosure, wherein example 33 also includes the subject matter according to example 32, above.

As tip-interface portion 150 of body is received within through cavity 162 of tip 160, engagement between tooth 157 and notch 159 can help to rotationally reposition tip 160 relative to tip-interface portion 150, if tip 160 is initially rotationally misaligned relative to tip-interface portion 150, such that tip 160 becomes rotationally aligned with tip-interface portion 150.

Referring generally to FIG. 1A and particularly to, e.g., FIGS. 2, 4, 7A-8A, 8C, 8E, 10A, and 13A-13C, body 110 further comprises first coupler interface 152. Tip 160 further comprises second coupler interface 164. Coupler 154 comprises first portion 166, engaged with first coupler interface 152 of body 110 when tip 160 is coupled with body 110, and second portion 169, releasably engaged with second coupler interface 164 of tip 160 when tip 160 is coupled with body 110. The preceding subject matter of this paragraph characterizes example 34 of the present disclosure, wherein example 34 also includes the subject matter according to any one of examples 26 to 33, above.

First coupler interface 152 of body 110 and first portion 166 of coupler 154 facilitate interlocking of body 110 with coupler 154. Second coupler interface 164 of tip 160 and second portion 169 of coupler 154 facilitate interlocking of tip 160 with coupler 154.

Referring generally to FIG. 1A and particularly to, e.g., FIGS. 2, 4, 7A-8A, 8C, 8E, 10A, and 13A-13C, first coupler interface 152 of body 110 comprises one of a projection or a recess. When first coupler interface 152 of body 110 comprises the projection, first portion 166 of coupler 154 comprises the recess. When first coupler interface 152 of body 110 comprises the recess, first portion 166 of coupler 154 comprises the projection. The projection is receivable within the recess to engage first portion 166 of coupler 154 with first coupler interface 152 of body 110. The preceding subject matter of this paragraph characterizes example 35 of the present disclosure, wherein example 35 also includes the subject matter according to example 34, above.

The projection, being receivable within the recess, provides a secure and reliable interlock between body 110 and coupler 154, and helps to prevent movement of coupler 154 relative to body 110 in multiple degrees of freedom.

Referring generally to FIG. 1A and particularly to, e.g., FIGS. 2, 4, 7A, 8A, 8C, 8E, 10A, and 13A-13C, the recess is a through aperture. The preceding subject matter of this paragraph characterizes example 36 of the present disclosure, wherein example 36 also includes the subject matter according to example 35, above.

Recess, being a through aperture, helps to facilitate a low profile or reduced thickness of body 110 or coupler 154. Additionally, recess, being a through aperture, helps to simplify manufacturing of body 110 or coupler 154.

Referring generally to FIG. 1A and particularly to, e.g., FIGS. 2, 4, 7A-8A, 8C, 8E, 10A, and 13A-13C, second coupler interface 164 of tip 160 comprises a projection. Second portion 169 of coupler 154 comprises a recess. The projection of second coupler interface 164 of tip 160 is receivable within the recess of second portion 169 of coupler 154 to engage second portion 169 of coupler 154 with second coupler interface 164 of tip 160. The preceding subject matter of this paragraph characterizes example 37 of the present disclosure, wherein example 37 also includes the subject matter according to any one of examples 34 to 36, above.

The projection, being receivable within the recess, provides a secure and reliable interlock between tip 160 and coupler 154, and helps to prevent movement of tip 160 relative to coupler 154 in multiple degrees of freedom.

Referring generally to FIG. 1A and particularly to, e.g., FIGS. 2, 4, 7A-8A, 8C, 8E, 10A, and 13A-13C, the recess is a through aperture. The preceding subject matter of this paragraph characterizes example 38 of the present disclosure, wherein example 38 also includes the subject matter according to example 37, above.

Recess, being a through aperture, helps to facilitate a low profile or reduced thickness of coupler 154. Additionally, recess, being a through aperture, helps to simplify manufacturing of coupler 154.

Referring generally to FIG. 1A and particularly to, e.g., FIGS. 7A-8G, 10A, and 13A-13C, relief of the projection of second coupler interface 164 decreases toward through cavity 162 of tip 160. The preceding subject matter of this paragraph characterizes example 39 of the present disclosure, wherein example 39 also includes the subject matter according to any one of examples 37 to 38, above.

Relief of the projection of second coupler interface 164, decreasing toward through cavity 162 of tip 160, promotes progressive engagement between second coupler interface 164 and second portion 169 of coupler 154 as tip 160 is releasably attached to body 110. More specifically, relief of the projection of second coupler interface 164, decreasing toward through cavity 162 of tip 160, allows second coupler interface 164 to progressively increase deflection of second portion 169 of coupler 154 away from body 110 as tip 160 is releasably attached to body 110 until recess of second portion 169 of coupler 154 receives projection of second coupler interface 164 and second portion 169 of coupler 154 moves back toward body 110.

Referring generally to FIG. 1A and particularly to, e.g., FIGS. 8B, 8D, 8F, and 12, at least a part of second portion 169 of coupler 154 is not parallel with first portion 166 of the coupler and diverges away from body 110 when tip 160 is coupled with body 110. The preceding subject matter of this paragraph characterizes example 40 of the present disclosure, wherein example 40 also includes the subject matter according to any one of examples 34 to 39, above.

At least the part of second portion 169 of coupler 154, not being parallel with first portion 166 of the coupler and diverging away from body 110 when tip 160 is coupled with body 110 and coupler 154 is interlocked with body 110, facilitates engagement between second portion 169 of coupler 154 and second coupler interface 164 of tip 160 as tip 160 is releasably attached to body 110 by promoting deflection of second portion 169 of coupler 154 away from body 110.

Referring generally to FIG. 1A and particularly to, e.g., FIGS. 4, 7A-8G, 10A, and 13A-13C, retainer 156 comprises a band, constricting both body 110 and coupler 154 to maintain coupler 154 in contact with body 110. The preceding subject matter of this paragraph characterizes example 41 of the present disclosure, wherein example 41 also includes the subject matter according to any one of examples 26 to 40, above.

Constricting body 110 and coupler 154 to maintain coupler 154 in contact with body 110 promotes secure and releasable interlocking of coupler 154 with body 110.

Referring generally to FIG. 1A and particularly to, e.g., FIGS. 4, 7A-8G, 10A, and 13A-13C, the band is elastic. The preceding subject matter of this paragraph characterizes example 42 of the present disclosure, wherein example 42 also includes the subject matter according to example 41, above.

The elasticity of the band promotes the maintaining of coupler 154 in contact with body 110 while facilitating a biased return of second portion 169 of coupler 154 towards body 110 when recess of second portion 169 of coupler 154 receives projection of second coupler interface 164.

Referring generally to FIG. 1A and particularly to, e.g., FIGS. 4, 7A-8A, 8C, 8E, 10A, and 13A-13C, retainer 156 comprises two elastic bands, spaced apart from each other along body 110. The preceding subject matter of this paragraph characterizes example 43 of the present disclosure, wherein example 43 also includes the subject matter according to example 41, above.

Use of two elastic bands, spaced apart from each other along body 110, promotes the maintaining of coupler 154 in contact with body 110 by providing two spaced-apart constriction forces against coupler 154.

Figure 3:
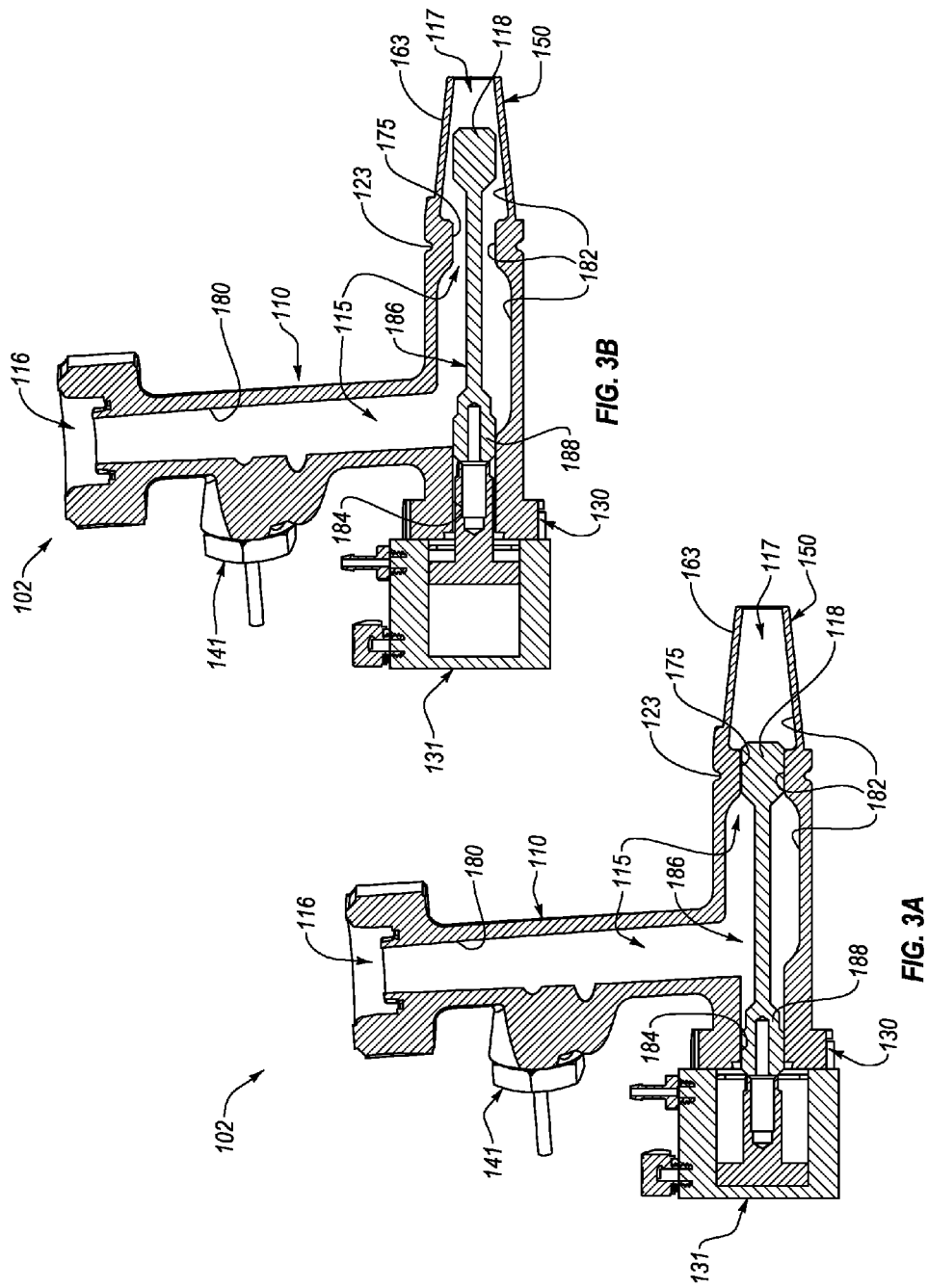

Referring generally to FIG. 1A and particularly to, e.g., FIGS. 2-3 and 14, body 110 comprises groove 123, configured to locate retainer 156 relative to body 110 when retainer 156 constricts body 110 and coupler 154 to maintain coupler 154 interlocked with body 110 and with tip 160. The preceding subject matter of this paragraph characterizes example 44 of the present disclosure, wherein example 44 also includes the subject matter according to any one of examples 26 to 43, above.

When retainer 156 is located in groove 123, groove 123 helps to maintain retainer 156 in place on body 110.

Referring generally to FIG. 1A and particularly to, e.g., FIGS. 4, 7A-8G, 10A, and 8A-8C, applicator 102 further comprises second coupler 154a. Coupler 154 and second coupler 154a are on opposite sides of body 110 when retainer 156 constricts body 110, coupler 154, and second coupler 154a to maintain coupler 154 and second coupler 154a interlocked with body 110 and with tip 160. The preceding subject matter of this paragraph characterizes example 45 of the present disclosure, wherein example 45 also includes the subject matter according to any one of examples 26 to 44, above.

Coupler 154 and second coupler 154a, being on opposite sides of body 110, promote strong, reliable, and redundant interlocking with tip 160 and body 110. Additionally, for example, body 110 includes third coupler interface 152a on a side of body 110 opposite that of first coupler interface 152. Tip 160 may further comprises fourth coupler interface 164a on a side of tip 160 opposite that of second coupler interface 164. Second coupler 154a may comprise third portion 166a and fourth portion 169a. Third portion 166a of second coupler 154a is engaged with third coupler interface 152a of body 110 when tip 160 is coupled with body 110, and fourth portion 169a of second coupler 154a is releasably engaged with fourth coupler interface 164a of tip 160 when tip 160 is coupled with body 110.

Referring generally to FIGS. 1A and 1B and particularly to, e.g., FIGS. 10A and 11, installation device 300 for coupling tip 160 to body 110 of applicator 102 is disclosed. Applicator 102 comprises coupler 154, releasably engageable with tip 160 to interlock tip 160 with body 110 of applicator 102. Installation device 300 comprises tip holder 362 that comprises two resilient pawls 361, opposing each other and configured to releasably retain tip 160. The preceding subject matter of this paragraph characterizes example 46 of the present disclosure.

Installation device 300 facilitates the automated coupling of tip 160 to body 110 of applicator 102. For example, installation device 300 releasably retains tip 160 in preparation for body 110 of applicator 102 to be located by end-effector 101 such that tip 160 interlocks with body 110 to couple tip 160 to body 110. After tip 160, releasably retained by two resilient pawls 361 of installation device 300, interlocks with body 110 of applicator 102, movement of body 110 of applicator 102 away from installation device 300 causes installation device 300 to release tip 160 from two resilient pawls 361 of installation device 300. According to one example, each of two resilient pawls 361 includes a tip engagement feature, such as a tooth or groove, configured to engage a corresponding feature of tip 160.

Referring generally to FIGS. 1A and 1B and particularly to, e.g., FIGS. 10A and 11, installation device 300 further comprises base 363. Tip holder 362 is releasably coupled to base 363. The preceding subject matter of this paragraph characterizes example 47 of the present disclosure, wherein example 47 also includes the subject matter according to example 46, above.

Tip holder 362, being releasably coupled to base 363, allows installation device 300 to accommodate different sizes or configurations of tip holder 362, which provides for the installation of different sizes or configurations of tip 160. For example, tip holder 362, having a first configuration for releasably retaining tip 160 of a first type, can be released from tip holder 362 and replaced with tip holder 362, having a second configuration for releasably retaining tip 160 of a second type.

Referring generally to FIGS. 1A and 1B and particularly to, e.g., FIG. 11, base 363 comprises pocket 369. Tip holder 362 is receivable within pocket 369. The preceding subject matter of this paragraph characterizes example 48 of the present disclosure, wherein example 48 also includes the subject matter according to example 47, above.

Pocket 369 promotes releasable coupling of tip holder 362 to base 363. In one example, pocket 369 is configured to allow movement of tip holder 362 in only one degree of freedom relative to base 363.

Referring generally to FIGS. 1A and 1B and particularly to, e.g., FIGS. 10A and 11, tip holder 362 further comprises projection 365, located between two resilient pawls 361 of tip holder 362 and spaced away from each of two resilient pawls 361. The preceding subject matter of this paragraph characterizes example 49 of the present disclosure, wherein example 49 also includes the subject matter according to example 48, above.

Projection 365 helps to orientate tip 160 in proper orientation, when two resilient pawls 361 releasably retain tip 160, while allowing for two resilient pawls 361 to flex.

Referring generally to FIGS. 1A and 1B and particularly to, e.g., FIGS. 10A and 11, projection 365 of tip holder 362 is shorter than two resilient pawls 361 of tip holder 362. The preceding subject matter of this paragraph characterizes example 50 of the present disclosure, wherein example 50 also includes the subject matter according to example 49, above.

Projection 365 of tip holder 362, being shorter than two resilient pawls 361 of tip holder 362, allows tip 160 to be properly oriented by projection 365 while being releasably retained by two resilient pawls 361.

Referring generally to FIGS. 1A and 1B and particularly to, e.g., FIGS. 10A and 11, base 363 further comprises ledge 371. Two resilient pawls 361 of tip holder 362 extend away from base 363 in first direction 410. Ledge 371 is spaced away from two resilient pawls 361 of tip holder 362 in third direction 414, which is perpendicular to first direction 410. The preceding subject matter of this paragraph characterizes example 51 of the present disclosure, wherein example 51 also includes the subject matter according to example 50, above.

Ledge 371 allows movement of tip 160, when releasably retained by two resilient pawls 361 of tip holder 362, to be constrained in third direction 414.

Referring generally to FIGS. 1A and 1B and particularly to, e.g., FIGS. 10A and 11, base 363 further comprises recess 367, formed in ledge 371. Recess 367 has abutment wall 380. Abutment wall 380 of recess 367 and projection 365 of tip holder 362 prevent tip 160 from moving in second direction 412, opposite first direction 410, toward base 363 when tip 160 is releasably retained by two resilient pawls 361. Abutment wall 380 of recess 367 and projection 365 of tip holder 362 prevent tip 160 from rotating relative to base 363 about an axis perpendicular to a first line, extending in second direction 412, and a second line, extending in third direction 414, when tip 160 is releasably retained by two resilient pawls 361. The preceding subject matter of this paragraph characterizes example 52 of the present disclosure, wherein example 52 also includes the subject matter according to example 51, above.

Abutment wall 380 of recess 367 and projection 365 of tip holder 362 help to maintain tip 160, releasably retained by two resilient pawls 361, in a proper orientation for interlocking with body 110 of applicator 102. As an example, abutment wall 380 of recess 367 and projection 365 of tip holder 362 help resist rotation of tip 160 as body 110 of applicator 102 is being interlocked with tip 160.

Referring generally to FIGS. 1A and 1B and particularly to, e.g., FIGS. 10A and 11, recess 367 is circumferentially open in first direction 410 away from base 363. The preceding subject matter of this paragraph characterizes example 53 of the present disclosure, wherein example 53 also includes the subject matter according to example 52, above.

Recess 367, being circumferentially open in first direction 410 away from base 363, allows tip 160 to be removed from recess 367 in first direction 410.

Referring generally to FIGS. 1A and 1C and particularly to, e.g., FIGS. 10B and 12-13C, removal device 400 for decoupling tip 160 from body 110 of applicator 102 is disclosed. Removal device 400 comprises wall 430, which comprises proximal edge 440 and distal edge 442, opposite proximal edge 440. Removal device 400 also comprises through channel 460 in wall 430. Removal device 400 further comprises pawl 404, comprising proximal end 444, coupled to wall 430, distal end 446, opposite proximal end 444, first side 462 between proximal end 444 and distal end 446, and second side 464, opposite to first side 462. Distal end 446, first side 462, and second side 464 of pawl 404 are delimited by through channel 460 and pawl 404 extends in fifth direction 420 from proximal end 444 to distal end 446 between proximal edge 440 of wall 430 and distal edge 442 of wall 430. Removal device 400 additionally comprises wedge 406, extending from wall 430 and perpendicular to wall 430. The preceding subject matter of this paragraph characterizes example 54 of the present disclosure.

Removal device 400 facilitates the automated decoupling of tip 160 from body 110 of applicator 102. As one example, removal device 400 promotes concurrent disengagement of coupler 154 of applicator 102 from tip 160 and prevention of movement of tip 160 in fifth direction 420 as body 110 of applicator 102 moves in fifth direction 420. Pawl 404, being coupled to wall 430 and having distal end 446, first side 462, and second side 464 delimited by through channel 460, helps to streamline removal device 400 and promotes consistent flexing of pawl 404 relative to wall 430. Wedge 406, extending perpendicular to wall 430, locates wedge 406 relative to pawl 404 such that coupler 154 of applicator 102 can be engaged by wedge 406 when tip 160 is engaged by pawl 404. Also, wedge 406 provides mechanical advantage for separating coupler 154 from tip 160.

Referring generally to FIGS. 1A and 1C and particularly to, e.g., FIGS. 10B and 12-13C, wedge 406 comprises leading edge 450 that extends from distal edge 442 of wall 430. The preceding subject matter of this paragraph characterizes example 55 of the present disclosure, wherein example 55 also includes the subject matter according to example 54, above.

Leading edge 450 of wedge 406 promotes engagement with coupler 154 of applicator 102. As an example, leading edge 450 can be a relatively sharp edge for facilitating insertion of wedge 406 between coupler 154 and tip 106.

Referring generally to FIGS. 1A and 1C and particularly to, e.g., FIGS. 10B and 12-13C, leading edge 450 of wedge 406 and distal edge 442 of wall 430 both face in fifth direction 420 and leading edge 450 of wedge 406 is perpendicular to distal edge 442 of wall 430. The preceding subject matter of this paragraph characterizes example 56 of the present disclosure, wherein example 56 also includes the subject matter according to example 55, above.

Leading edge 450 of wedge 406, being perpendicular to distal edge 442 of wall 430, locates leading edge 450 relative to pawl 404 such that coupler 154 of applicator 102 can be engaged by leading edge 450 when tip 160 is engaged by pawl 404.

Referring generally to FIGS. 1A and 1C and particularly to, e.g., FIGS. 10B and 12-13C, removal device 400, further comprises second wall 432, extending from wall 430 perpendicularly to wall 430. Wedge 406 forms a portion of second wall 432. The preceding subject matter of this paragraph characterizes example 57 of the present disclosure, wherein example 57 also includes the subject matter according to any one of examples 54 to 56, above.

Forming wedge 406 as a portion of second wall 432 allows wedge 406 to be structurally supported by second wall 432. Accordingly, second wall 432 promotes strength and rigidity of wedge 406.

Referring generally to FIGS. 1A and 1C and particularly to, e.g., FIGS. 10B and 12-13C, removal device 400 further comprises second wedge 406a, extending from wall 430 and perpendicular to wall 430. Removal device 400 also comprises third wall 434, extending from wall 430 perpendicularly to wall 430 and spaced-apart from second wall 432. Second wedge 406a comprises second leading edge 450a that extends from distal edge 442 of wall 430 and forms a portion of third wall 434. The preceding subject matter of this paragraph characterizes example 58 of the present disclosure, wherein example 58 also includes the subject matter according to example 57, above.

Second wedge 406a, extending perpendicular to wall 430, locates second wedge 406a relative to pawl 404 such that second coupler 154a of applicator 102 can be engaged by second wedge 406a when tip 160 is engaged by pawl 404. Also, the shape of second wedge 406a provides mechanical advantage for separating second coupler 154a from tip 160. Second leading edge 450a of second wedge 406a promotes engagement with second coupler 154a of applicator 102. As an example, second leading edge 450a can be a relatively sharp edge for facilitating insertion of second wedge 406a between second coupler 154a and tip 106. Forming second wedge 406a as a portion of third wall 434 allows second wedge 406a to be structurally supported by third wall 434. Accordingly, third wall 434 promotes strength and rigidity of second wedge 406a.

Referring generally to FIGS. 1A and 1C and particularly to, e.g., FIGS. 10B and 12-13C, second leading edge 450a of second wedge 406a and distal edge 442 of wall 430 both face in fifth direction 420 and second leading edge 450a of second wedge 406a is perpendicular to distal edge 442 of wall 430. The preceding subject matter of this paragraph characterizes example 59 of the present disclosure, wherein example 59 also includes the subject matter according to example 58, above.

Second leading edge 450a of second wedge 406a, being perpendicular to distal edge 442 of wall 430, locates second leading edge 450a relative to pawl 404 such that second coupler 154a of applicator 102 can be engaged by second leading edge 450a when tip 160 is engaged by pawl 404.

Referring generally to FIGS. 1A and 1C and particularly to, e.g., FIGS. 10B and 12-13C, pawl 404 is in a resting position, in which pawl 404 is parallel to wall 430, when no force acts on pawl 404. Pawl 404 is deflected away from wall 430 in seventh direction 424 to flexed position in which pawl 404 is non-parallel to wall 430, when an external force acts on pawl 404 in seventh direction 424, perpendicular to wall 430. Pawl 404 automatically flexes in eighth direction 236 back to the resting position, when the external force is removed from pawl 404. The preceding subject matter of this paragraph characterizes example 60 of the present disclosure, wherein example 60 also includes the subject matter according to any one of examples 54 to 59, above.

Pawl 404 allows third tooth 161 of tip 160, while interlocked with body 110 of applicator 102, to cause pawl 404 to deflect into flexed position and automatically flex back to resting position as tip 160 moves in sixth direction 422 relative to pawl 404.

Referring generally to, e.g., FIGS. 10B and 12-13C and particularly to FIGS. 15A and 15B, method 500 of removing tip 160 from body 110 of applicator 102, fixed to end-effector 101, is disclosed. Applicator 102 comprises coupler 154, releasably engageable with tip 160 to interlock tip 160 with body 110 of applicator 102. Method 500 comprises (block 502), with coupler 154 of applicator 102 releasably engaged with tip 160, locating end-effector 101 so that pawl 404 is engaged with third tooth 161 on tip 160 to prevent movement of tip 160 in fifth direction 420 away from pawl 404 and wedge 406 disengages coupler 154 of applicator 102 from tip 160. Method 500 additionally comprises, (block 504) with pawl 404 engaged with third tooth 161 on tip 160 and coupler 154 of applicator 102 disengaged from tip 160 by wedge 406, using end-effector 101 to move body 110 of applicator 102 in fifth direction 420 to disengage tip 160 from body 110 of applicator 102. The preceding subject matter of this paragraph characterizes example 61 of the present disclosure.

Method 500 facilitates the automated decoupling of tip 160 from body 110 of applicator 102. As one example, method 500 promotes concurrent and automatic disengagement of coupler 154 of applicator 102 from tip 160 and prevention of movement of tip 160 in fifth direction 420 as body 110 of applicator 102 moves in fifth direction 420. Wedge 406 provides mechanical advantage for disengaging coupler 154 from tip 160. In one example, after body 110 of applicator 102 is moved in fifth direction 420 to disengage tip 160 from body 110 of applicator 102, applicator 102 falls away from pawl 404 and body 110 of applicator 102 in eighth direction 426, perpendicular to fifth direction 420, by the force of gravity.

Referring generally to, e.g., FIGS. 10B and 12-13C and particularly to FIG. 15A, according to method 500, locating end-effector 101 so that pawl 404 is engaged with third tooth 161 on tip 160 comprises (block 506) using end-effector 101 to move body 110 of applicator 102 toward pawl 404, in sixth direction 422 opposite fifth direction 420, along a straight line until pawl 404 engages third tooth 161. The preceding subject matter of this paragraph characterizes example 62 of the present disclosure, wherein example 62 also includes the subject matter according to example 61, above.

Engaging pawl 404 with third tooth 161 on tip 160 by moving body 110 of applicator 102 toward pawl 404, in sixth direction 422 opposite fifth direction 420, along a straight line until pawl 404 engages third tooth 161 allows third tooth 161 on tip 160 to become engaged with pawl 404 in a first manner that accommodates certain configurations of applicator 102 and/or environmental constraints, such as spatial constraints and end-effector control constraints.

Referring generally to, e.g., FIGS. 10B and 12-13C and particularly to FIG. 15A, according to method 500, (block 508) as end-effector 101 moves body 110 of applicator 102 in a straight line in sixth direction 422, wedge 406 causes coupler 154 of applicator 102 to disengage from tip 160. The preceding subject matter of this paragraph characterizes example 63 of the present disclosure, wherein example 63 also includes the subject matter according to example 62, above.

Disengaging coupler 154 of applicator 102 from tip 160 unlocks tip 160 from body 110 of applicator 102 to allow tip 160 to be removed from body 110 of applicator 102. More specifically, disengaging coupler 154 of applicator 102 from tip 160 as body 110 of applicator 102 moves in the straight line in sixth direction 422 facilitates concurrent engagement of pawl 404 with third tooth 161 on tip 106 and disengagement of coupler 154 of applicator 102 from tip 160, according to the first manner, which allows tip 160 to be removed from body 110 of applicator 102.

Referring generally to, e.g., FIGS. 10B and 12-13C and particularly to FIG. 15A, according to method 500, (block 510) locating end-effector 101, so that pawl 404 is engaged with third tooth 161 on tip 160, comprises resiliently flexing pawl 404. The preceding subject matter of this paragraph characterizes example 64 of the present disclosure, wherein example 64 also includes the subject matter according to any one of examples 61 to 63, above.

Resilient flexibility of pawl 404 allows third tooth 161 of tip 160, while interlocked with body 110 of applicator 102, to cause pawl 404 to deflect into a flexed position, as third tooth 161 of tip 160 moves in sixth direction 422 relative to pawl 404, and automatically flex back to a resting position as third tooth 161 of tip 160 moves in sixth direction 422 past the pawl 404.

Referring generally to, e.g., FIGS. 10B and 12-13C and particularly to FIG. 15A, according to method 500, (block 512) locating end-effector 101, so that pawl 404 is engaged with third tooth 161 on tip 160, comprises using end-effector 101 to move body 110 of applicator 102 in seventh direction 424, perpendicular to fifth direction 420, along a straight line until pawl 404 is engaged with third tooth 161 on tip 160. The preceding subject matter of this paragraph characterizes example 65 of the present disclosure, wherein example 65 also includes the subject matter according to any one of examples 61 to 63, above.

Engaging pawl 404 with third tooth 161 on tip 160 by moving body 110 of applicator 102 in seventh direction 424, perpendicular to fifth direction 420, along a straight line until pawl 404 engages third tooth 161 on tip 160 allows third tooth 161 on tip 160 to become engaged with pawl 404 in a second manner that accommodates certain other configurations of applicator 102 and/or other environmental constraints.

Referring generally to, e.g., FIGS. 10B and 12-13C and particularly to FIG. 15A, according to method 500, (block 514) as end-effector 101 moves body 110 of applicator 102 in a straight line in seventh direction 424, perpendicular to fifth direction 420, wedge 406 causes coupler 154 of applicator 102 to disengage from tip 160. The preceding subject matter of this paragraph characterizes example 66 of the present disclosure, wherein example 66 also includes the subject matter according to example 65, above.

Disengaging coupler 154 of applicator 102 from tip 160 unlocks tip 160 from body 110 of applicator 102 to allow tip 160 to be removed from body 110 of applicator 102. More specifically, disengaging coupler 154 of applicator 102 from tip 160 as body 110 of applicator 102 moves in the straight line in seventh direction 424 facilitates concurrent engagement of pawl 404 with third tooth 161 on tip 106 and disengagement of coupler 154 of applicator 102 from tip 160, according to the second manner, which allows tip 160 to be removed from body 110 of applicator 102.

Referring generally to, e.g., FIGS. 10B and 12-13C and particularly to FIG. 15A, according to method 500, (block 516) disengaging coupler 154 of applicator 102 from tip 160 with wedge 406 comprises moving coupler 154 away from tip 160. The preceding subject matter of this paragraph characterizes example 67 of the present disclosure, wherein example 67 also includes the subject matter according to any one of examples 61 to 66, above.

Moving coupler 154 away from tip 160 provides clearance for removing tip 160 from body 100 of applicator 102.

Referring generally to, e.g., FIGS. 10B and 12-13C and particularly to FIG. 15A, according to method 500, (block 518) applicator 102 further comprises retainer 156, configured to maintain coupler 154 in contact with body 110 and with tip 160 when tip 160 is interlocked with body 110 of applicator 102. Moving coupler 154 away from tip 160 comprises resiliently stretching retainer 156. The preceding subject matter of this paragraph characterizes example 68 of the present disclosure, wherein example 68 also includes the subject matter according to example 67, above.

Retainer 156, being resiliently stretchable, allows the coupler 154 to maintain contact with body 110 and with tip 160 until a force sufficient to overcome the bias of retainer 156 is applied to retainer 156, such as by wedge 406, which promotes the movement of coupler 154 away from tip 160 and removal of tip 160 from body 110 of applicator 102.

Examples of the present disclosure may be described in the context of aircraft manufacturing and service method 1100 as shown in FIG. 16 and aircraft 1102 as shown in FIG. 16. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 17, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A removal device for decoupling a tip from a body of an applicator, the removal device comprising:
 a wall, comprising a proximal edge and a distal edge, opposite the proximal edge;
 a through channel in the wall;
 a pawl, comprising a proximal end, coupled to the wall, a distal end, opposite the proximal end, a first side between the proximal end and the distal end, and a second side, opposite to the first side, wherein the distal end, the first side, and the second side of the pawl are delimited by the through channel and the pawl extends in a fifth direction from the proximal end to the distal end between the proximal edge of the wall and the distal edge of the wall; and
 a wedge, extending from the wall and perpendicular to the wall.

2. The removal device according to claim 1, wherein the wedge comprises a leading edge that extends from the distal edge of the wall.

3. The removal device according to claim 2, wherein the leading edge of the wedge and the distal edge of the wall both face in the fifth direction and the leading edge of the wedge is perpendicular to the distal edge of the wall.

4. The removal device according to claim 1, further comprising a second wall, extending from the wall perpendicularly to the wall, wherein the wedge forms a portion of the second wall.

5. The removal device according to claim 4, further comprising:
 a second wedge, extending from the wall and perpendicular to the wall; and
 a third wall, extending from the wall perpendicularly to the wall and spaced-apart from the second wall;
 wherein the second wedge comprises a second leading edge that extends from the distal edge of the wall and forms a portion of the third wall.

6. The removal device according to claim 5, wherein the second leading edge of the second wedge and the distal edge of the wall both face in the fifth direction and the second leading edge of the second wedge is perpendicular to the distal edge of the wall.

7. The removal device according to claim 1, wherein:
 the pawl is in a resting position, in which the pawl is parallel to the wall, when no force acts on the pawl;
 the pawl is deflected away from the wall in a seventh direction to a flexed position in which the pawl is non-parallel to the wall, when an external force acts on the pawl in the seventh direction, perpendicular to the wall; and
 the pawl automatically flexes in an eighth direction back to the resting position, when the external force is removed from the pawl.

8. The removal device according to claim 2, further comprising a second wall, extending from the wall perpendicularly to the wall, and wherein the wedge forms a portion of the second wall.

9. The removal device according to claim 3, further comprising a second wall, extending from the wall perpendicularly to the wall, and wherein the wedge forms a portion of the second wall.

10. The removal device according to claim 2, wherein:
 the pawl is in a resting position, in which the pawl is parallel to the wall, when no force acts on the pawl;
 the pawl is deflected away from the wall in a seventh direction to a flexed position, in which the pawl is non-parallel to the wall, when an external force acts on the pawl in the seventh direction, perpendicular to the wall; and
 the pawl automatically flexes in an eighth direction back to the resting position when the external force is removed from the pawl.

11. The removal device according to claim 3, wherein:
 the pawl is in a resting position, in which the pawl is parallel to the wall, when no force acts on the pawl;
 the pawl is deflected away from the wall in a seventh direction to a flexed position, in which the pawl is non-parallel to the wall, when an external force acts on the pawl in the seventh direction, perpendicular to the wall; and the pawl automatically flexes in an eighth direction back to the resting position when the external force is removed from the pawl.

12. The removal device according to claim 4, wherein:

the pawl is in a resting position, in which the pawl is parallel to the wall, when no force acts on the pawl;

the pawl is deflected away from the wall in a seventh direction to a flexed position, in which the pawl is non-parallel to the wall, when an external force acts on the pawl in the seventh direction, perpendicular to the wall; and the pawl automatically flexes in an eighth direction back to the resting position when the external force is removed from the pawl.

13. The removal device according to claim 5, wherein:

the pawl is in a resting position, in which the pawl is parallel to the wall, when no force acts on the pawl;

the pawl is deflected away from the wall in a seventh direction to a flexed position, in which the pawl is non-parallel to the wall, when an external force acts on the pawl in the seventh direction, perpendicular to the wall; and the pawl automatically flexes in an eighth direction back to the resting position when the external force is removed from the pawl.

14. The removal device according to claim 6, wherein:

the pawl is in a resting position, in which the pawl is parallel to the wall, when no force acts on the pawl;

the pawl is deflected away from the wall in a seventh direction to a flexed position, in which the pawl is non-parallel to the wall, when an external force acts on the pawl in the seventh direction, perpendicular to the wall; and the pawl automatically flexes in an eighth direction back to the resting position when the external force is removed from the pawl.

\* \* \* \* \*